(12) United States Patent
Kobayashi et al.

(10) Patent No.: US 11,941,991 B2
(45) Date of Patent: Mar. 26, 2024

(54) PLATOONING OPERATION SYSTEM AND PLATOONING OPERATION METHOD

(71) Applicant: TOSHIBA DIGITAL SOLUTIONS CORPORATION, Kawasaki (JP)

(72) Inventors: Megumi Kobayashi, Kodaira (JP); Yasuto Hatafuku, Kawasaki (JP); Hideki Kubo, Fuchu (JP); Motokazu Iwasaki, Chiba (JP); Yoko Ikeda, Bunkyo (JP); Shinsuke Iuchi, Yokohama (JP); Kiyoshi Takemoto, Setagaya (JP); Kaori Kitami, Kunitachi (JP); Keishi Higashi, Hino (JP); Tatsuki Shiraishi, Tama (JP); Michiyo Sato, Yokohama (JP); Masaru Watabiki, Yokohama (JP)

(73) Assignee: TOSHIBA DIGITAL SOLUTIONS CORPORATION, Kawasaki (JP)

( * ) Notice: Subject to any disclaimer, the term of this patent is extended or adjusted under 35 U.S.C. 154(b) by 833 days.

(21) Appl. No.: 17/014,124

(22) Filed: Sep. 8, 2020

(65) Prior Publication Data
US 2020/0402408 A1 Dec. 24, 2020

Related U.S. Application Data

(63) Continuation of application No. PCT/JP2019/008723, filed on Mar. 5, 2019.

(30) Foreign Application Priority Data

Mar. 8, 2018 (JP) .................................. 2018-042202

(51) Int. Cl.
*G08G 1/00* (2006.01)
*G05D 1/00* (2006.01)
(Continued)

(52) U.S. Cl.
CPC ............. *G08G 1/22* (2013.01); *G05D 1/0291* (2013.01); *G06Q 10/10* (2013.01); *G06Q 40/08* (2013.01);
(Continued)

(58) Field of Classification Search
CPC ........ G07C 5/02; G06Q 50/265; G06Q 40/08; G06Q 10/10; G05D 1/0291; H04W 4/46; G08G 1/22
(Continued)

(56) References Cited

U.S. PATENT DOCUMENTS 10,395,332 B1 * 8/2019 Konrardy .............. G01S 19/485
2016/0293011 A1 * 10/2016 Erlich ...................... G08G 1/20
2018/0225963 A1 * 8/2018 Kobayashi ............... G08G 1/09

FOREIGN PATENT DOCUMENTS

JP  10-261195 A   9/1998
JP  11-283180 A   10/1999
(Continued)

OTHER PUBLICATIONS

KR1020150084125A (Year: 2015).*

*Primary Examiner* — Yazan A Soofi
(74) *Attorney, Agent, or Firm* — Maier & Maier, PLLC

(57) ABSTRACT

According to one embodiment, a platooning operation system organizes a platoon by making a plurality of vehicles cooperate. The platooning operation system includes an application acceptance processor and a platoon organization processor. The application acceptance processor accepts an application of a vehicle for admission to the platoon. The platoon organization processor which selects a platoon to which the vehicle is to be admitted or determines possibility of admission of the vehicle to the platoon, based on at least one of information on a driver driving the vehicle and information on the vehicle.

8 Claims, 22 Drawing Sheets

(51) Int. Cl.
*G05D 1/02* (2020.01)
*G06Q 10/10* (2023.01)
*G06Q 30/0283* (2023.01)
*G06Q 40/08* (2012.01)
*G06Q 50/26* (2012.01)
*G07C 5/02* (2006.01)
*H04W 4/46* (2018.01)

(52) U.S. Cl.
CPC ............. *G06Q 50/265* (2013.01); *G07C 5/02* (2013.01); *H04W 4/46* (2018.02); *G05D 2201/0213* (2013.01); *G06Q 30/0284* (2013.01)

(58) Field of Classification Search
USPC ........................................................ 701/117
See application file for complete search history.

(56) References Cited

FOREIGN PATENT DOCUMENTS

| | | |
|---|---|---|
| JP | 2003-115095 A | 4/2003 |
| JP | 2008-003675 A | 1/2008 |
| JP | 2009-265999 A | 11/2009 |
| JP | 2017-062691 A | 3/2017 |
| KR | 10-2015-0084125 A | 7/2015 |
| KR | 1020150084125 A * | 7/2015 |
| WO | WO 2017/047176 A1 | 3/2017 |
| WO | WO 2017/200433 A1 | 11/2017 |
| WO | WO 2018/039114 A1 | 3/2018 |

* cited by examiner

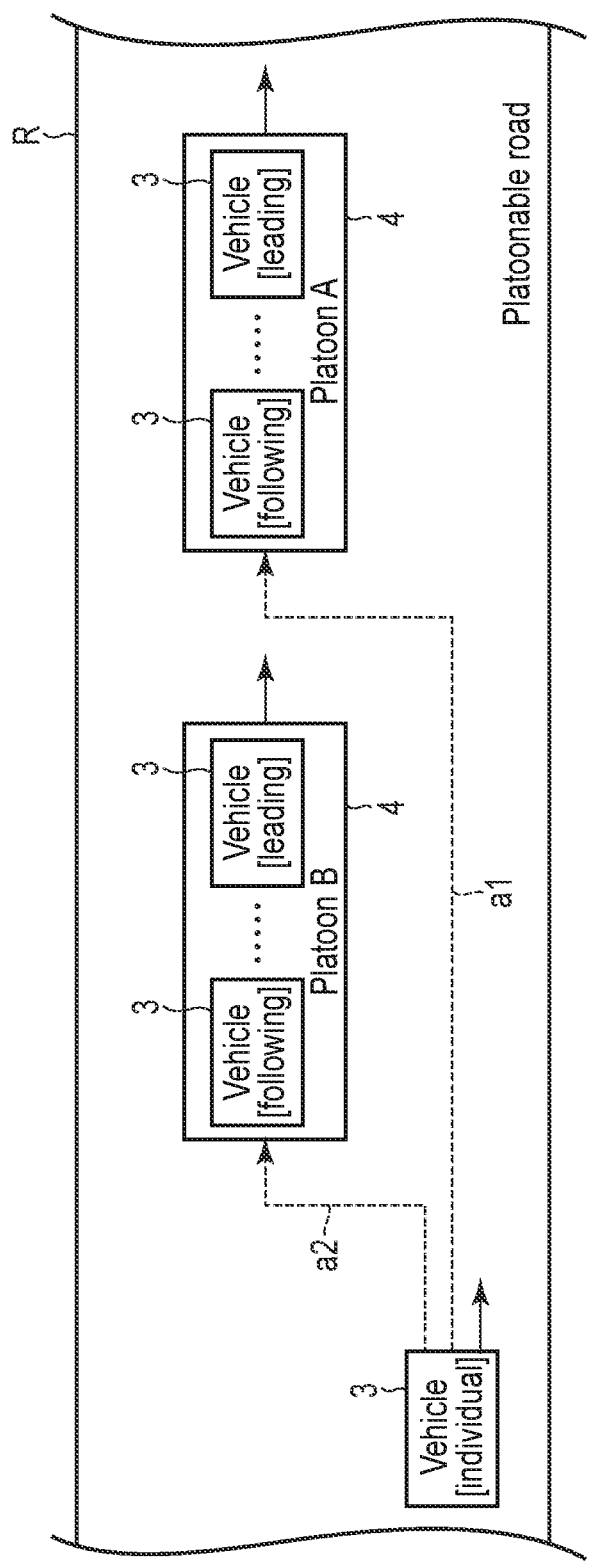
F I G. 2

| Acceptance No. | Lead/follow | Platoon admission status | Destination | Vehicle ID | Driver ID |
|---|---|---|---|---|---|
| aaaa | 1 (Follow) | 1 (to destination) | xxxx | xxxx | xxxx |
| bbbb | 1 (Follow) | 2 (to middle) | xxxx | xxxx | xxxx |
| cccc | 2 (Lead) | ——— | xxxx | xxxx | xxxx |
| dddd | 1 (Follow) | 0 (unadmitted) | xxxx | xxxx | xxxx |
| ⋮ | ⋮ | ⋮ | ⋮ | ⋮ | ⋮ |

| Vehicle ID | Attribute information[1] | ……… | Attribute information[n-1] | Attribute information[n] (Performance evaluation value) |
|---|---|---|---|---|
| xxxx | xxxxx | ……… | xxxxx | B |
| yyyy | yyyyy | ……… | yyyyy | A |
| ⋮ | ⋮ | ……… | ⋮ | ⋮ |
| zzzz | zzzzz | ……… | zzzzz | A |

| Driver ID | Attribute information[1] | ........ | Attribute information[n] | ~152C |
|---|---|---|---|---|
| xxxx | xxxxx | ........ | xxxxx | |
| ⋮ | ⋮ | ........ | ⋮ | |
| zzzz | zzzzz | ........ | zzzzz | |

FIG. 7

| Platoon ID | Destination | Current location | Number of organized vehicles | Leading vehicle | | |
|---|---|---|---|---|---|---|
| | | | | Vehicle ID | Driver ID | Leading time |
| xxxx | xxxx | xxxx | xxxx | xxxx | xxxx | xxxx |
| ⋮ | ⋮ | ⋮ | ⋮ | ⋮ | ⋮ | ⋮ |

153

| Following vehicle (1) | | | | Following vehicle (n) | | |
|---|---|---|---|---|---|---|
| Vehicle ID | Driver ID | Following time | ····· | Vehicle ID | Driver ID | Following time |
| xxxx | xxxx | xxxx | ····· | xxxx | xxxx | xxxx |
| ⋮ | ⋮ | ⋮ | ····· | ⋮ | ⋮ | ⋮ |

FIG. 8

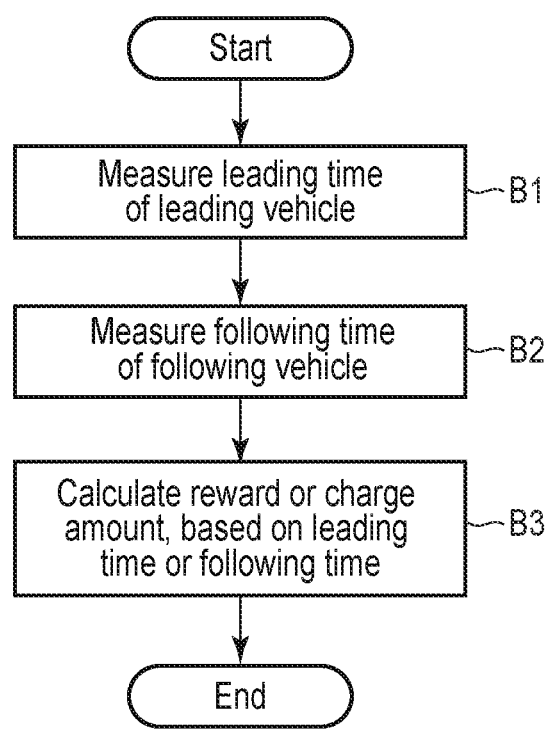
F I G. 11

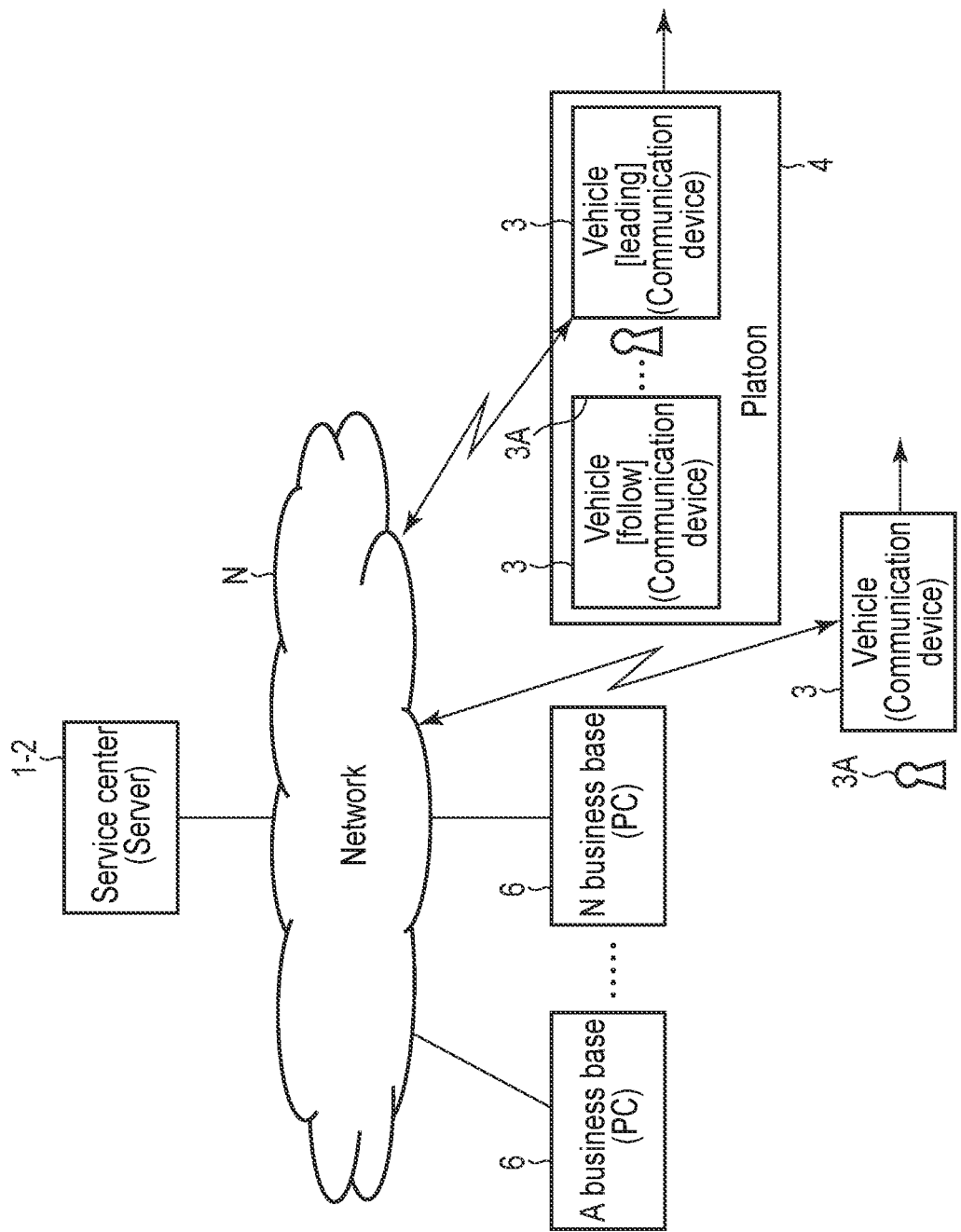
F I G. 12

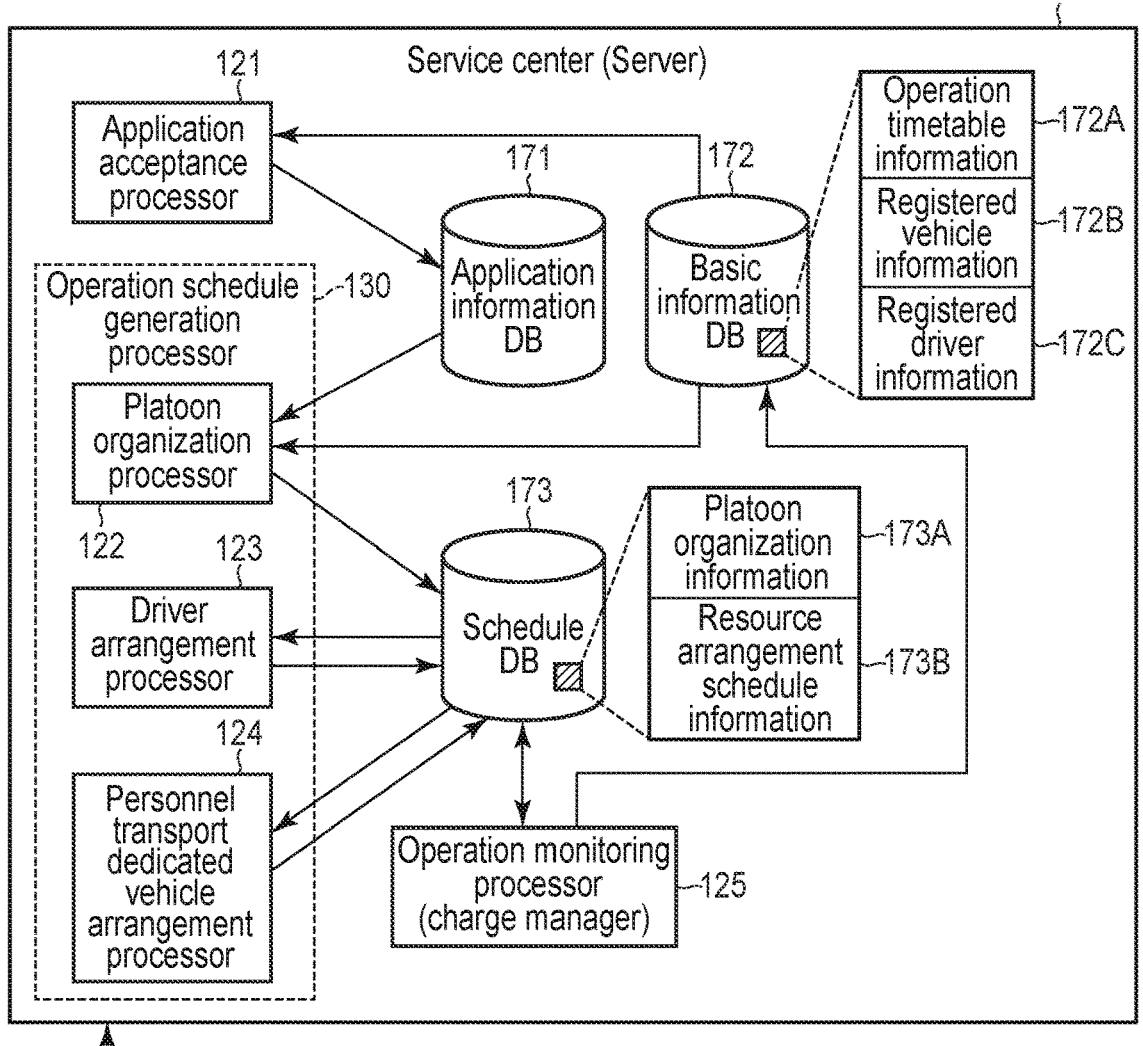
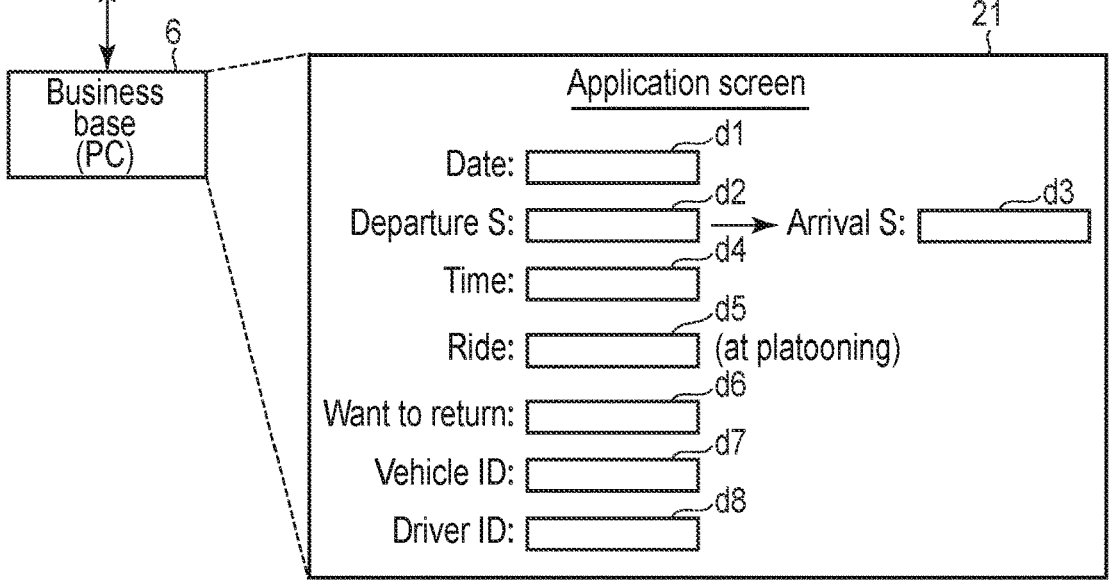
FIG. 16

Station N

| Departure time | Station [N+1] | Station [N+2] | ......... | Station [N+n] |
|---|---|---|---|---|
| 05:00 | 06:00 | 07:00 | ......... | 14:00 |
| 05:20 | 06:20 | 07:20 | ......... | 14:20 |
| 05:40 | 06:40 | 07:40 | ......... | 14:40 |
| ⋮ | ⋮ | ⋮ | ⋮ | ⋮ |
| 04:40 | 05:40 | 06:40 | ......... | 13:40 |

(A) Inbound

| Departure time | Station [N-1] | Station [N-2] | ......... | Station [N-m] |
|---|---|---|---|---|
| 05:10 | 06:10 | 07:10 | ......... | 14:10 |
| 05:30 | 06:30 | 07:30 | ......... | 14:30 |
| 05:50 | 06:50 | 07:50 | ......... | 14:50 |
| ⋮ | ⋮ | ⋮ | ⋮ | ⋮ |
| 04:50 | 05:50 | 06:50 | ......... | 13:50 |

(B) Outbound

F I G. 18

| Acceptance No. | Departure S | Arrival S | Departure time | Ride (Driver flag (1)) | Want to return | Vehicle ID | Driver ID |
|---|---|---|---|---|---|---|---|
| xxxx | xxxx | xxxx | xx:xx | NO (OFF) | NO | xxxx | xxxx |
| ⋮ | ⋮ | ⋮ | ⋮ | ⋮ | ⋮ | ⋮ | ⋮ |
| zzzz | zzzz | zzzz | zz:zz | YES (ON) | NO | zzzz | zzzz |

FIG. 19

| Vehicle ID | Attribute information[1] | ……… | Attribute information[n] | Performance evaluation value (Vehicle flag) |
|---|---|---|---|---|
| xxxx | xxxxx | ……… | xxxxx | B |
| yyyy | yyyyy | ……… | yyyyy | A |
| ⋮ | ⋮ | ……… | ⋮ | ⋮ |
| zzzz | zzzzz | ……… | zzzzz | A |

FIG. 20

| Driver ID | Attribute information[1] | ……… | Attribute information[n] |
|---|---|---|---|
| xxxx | xxxxx | ……… | xxxxx |
| ⋮ | ⋮ | ……… | ⋮ |
| zzzz | zzzzz | ……… | zzzzz |

FIG. 21

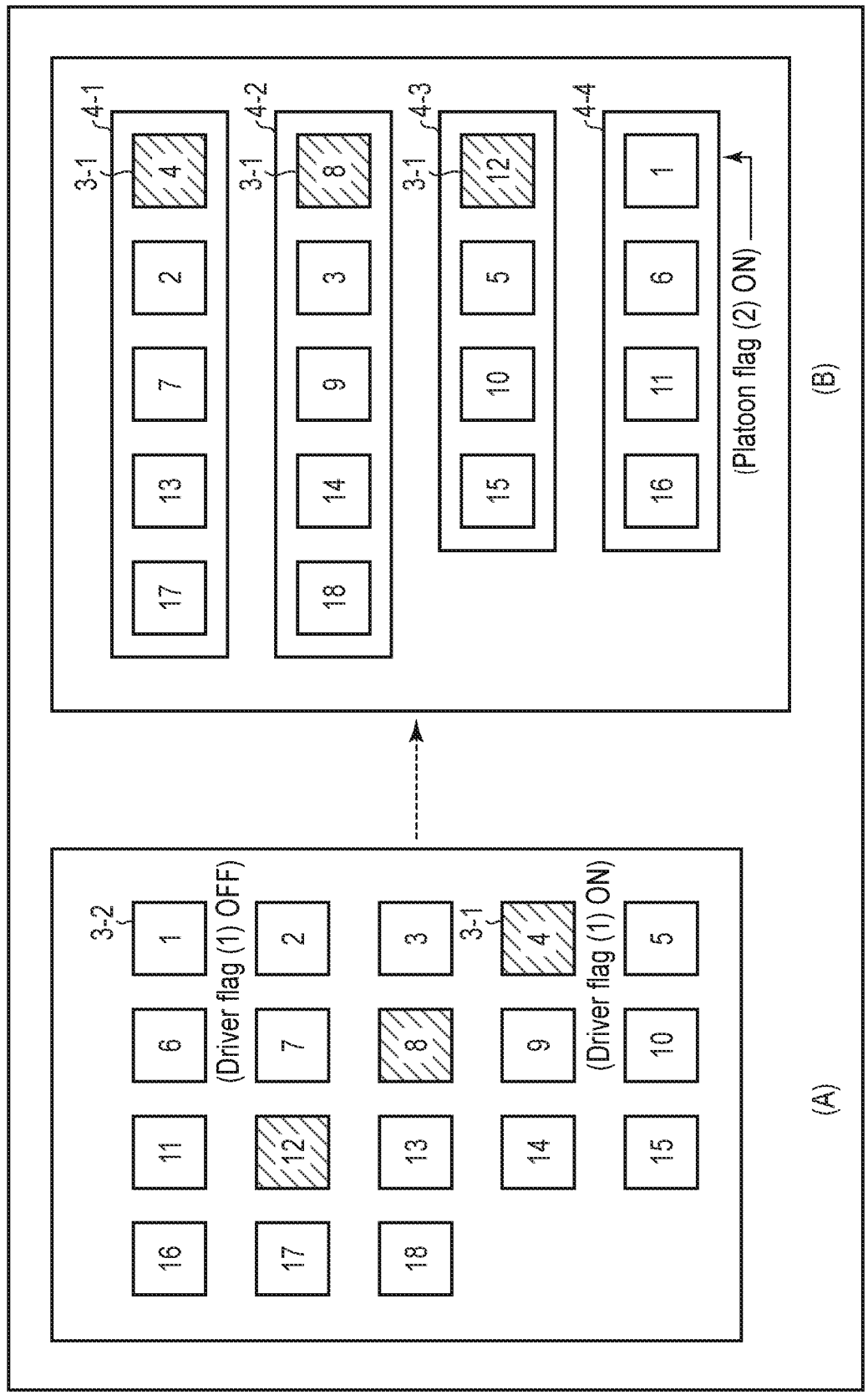
F I G. 22

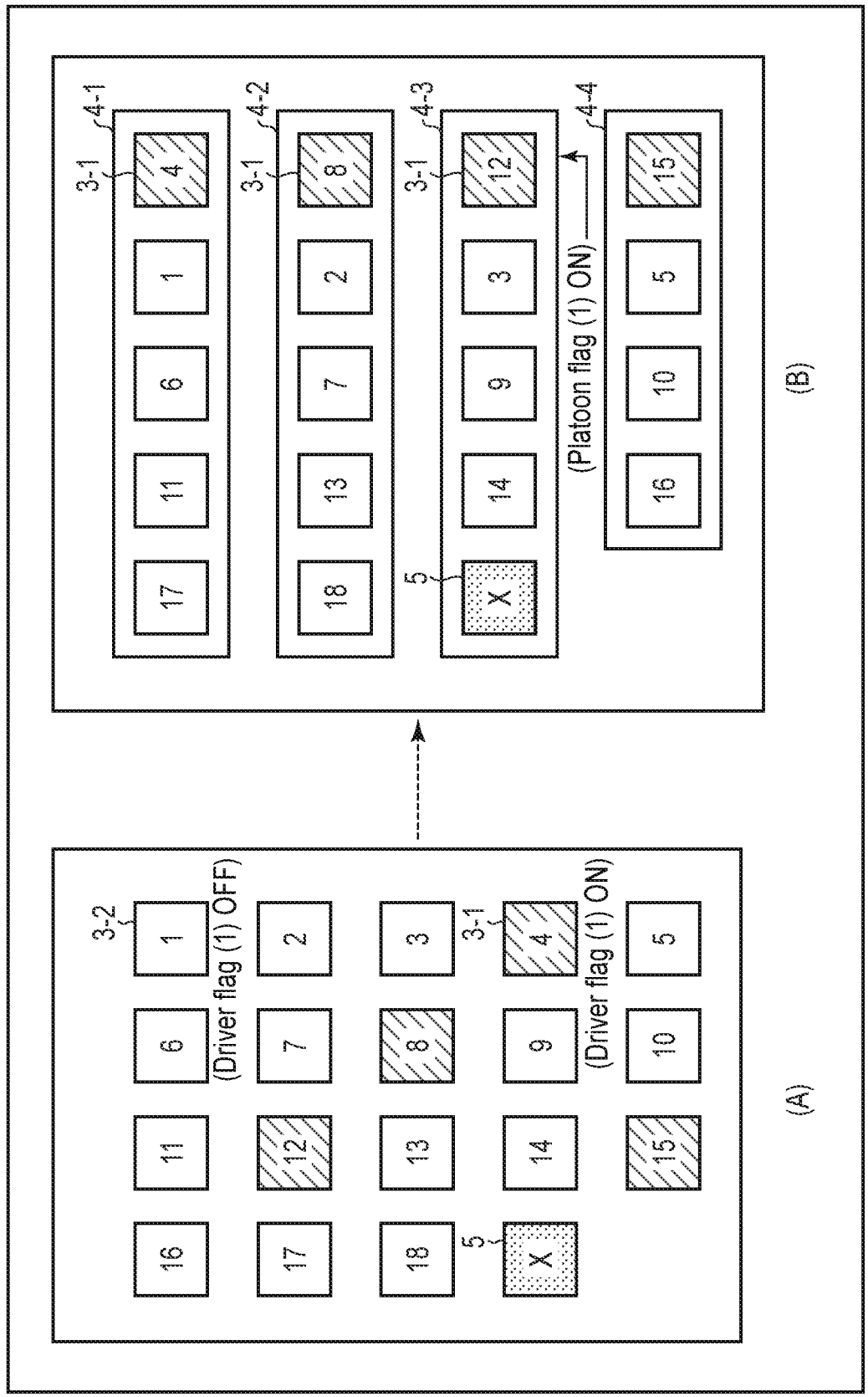
F I G. 23

| Platoon ID | Departure S | Arrival S | Departure time | Applicant [1] | | | ... |
| --- | --- | --- | --- | --- | --- | --- | --- |
| | | | | Vehicle ID [1] | Driver ID | Status [1] | |
| xxxx | xxxx | xxxx | xx:xx | xxxx | xxxx | xxxx | ... |
| ⋮ | ⋮ | ⋮ | ⋮ | ⋮ | ⋮ | ⋮ | |

| ... | Necessity of cooperation with vehicle dedicated for personnel transport (Platoon flag (1)) | Necessity of driver arrangement (Platoon flag (2)) |
| --- | --- | --- |
| ... | OFF | ON |
| | ⋮ | ⋮ |

F I G. 24

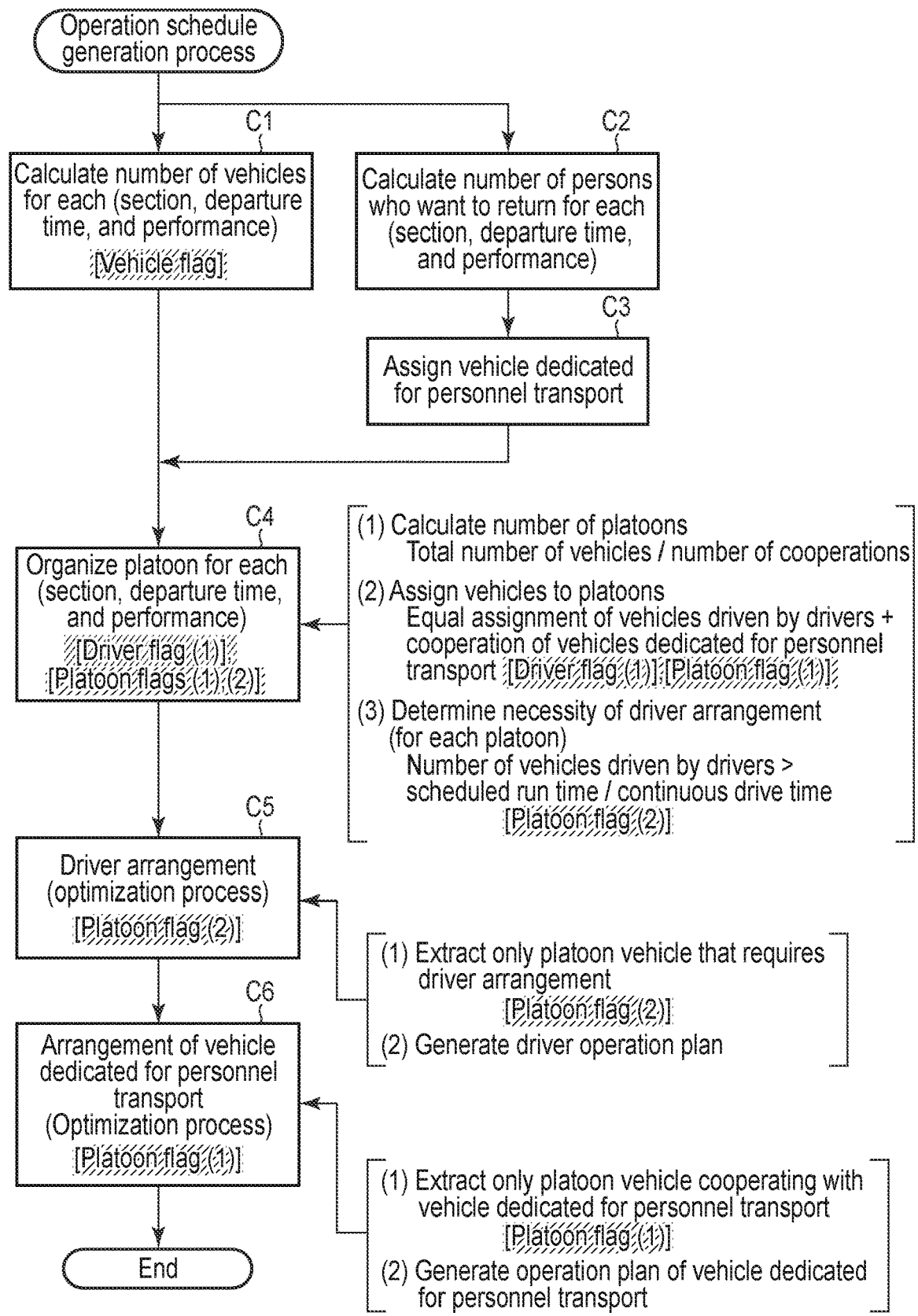
F I G. 25

PLATOONING OPERATION SYSTEM AND PLATOONING OPERATION METHOD

CROSS-REFERENCE TO RELATED APPLICATIONS

This application is a Continuation Application of PCT Application No. PCT/JP2019/008723, filed Mar. 5, 2019 and based upon and claiming the benefit of priority from Japanese Patent Application No. 2018-042202, filed Mar. 8, 2018, the entire contents of all of which are incorporated herein by reference.

FIELD

Embodiments described herein relate generally to a platooning operation system and a platooning operation method.

BACKGROUND

Recently, platooning and traveling by forming a platoon of a plurality of vehicles has been focused in accordance with advance of the driver assistance technology, the automatic drive technology, and the like.

For example, since a vehicle comprising a function of performing autonomous running while trailing a preceding vehicle is admitted to a platoon that is led by a certain vehicle, a driver of the vehicle admitted to the platoon does not need to drive and can take a rest, for example, in the vehicle.

However, making vehicles comprising a function of cooperating with the other vehicles to run cooperate unconditionally is not realistic in safety and the like, and a system of appropriately organizing the platoon under appropriate standards is required.

BRIEF DESCRIPTION OF THE DRAWINGS

FIG. 2 is a diagram illustrating a summary of platoon organization performed by the platooning operation system according to the first embodiment.

FIG. 5 is a table showing an example of application information in the platooning operation system according to the first embodiment.

FIG. 6 is a table showing an example of registered vehicle information in the platooning operation system according to the first embodiment.

FIG. 7 is a table showing an example of registered driver information in the platooning operation system according to the first embodiment.

FIG. 8 is a table showing an example of platoon information in the platooning operation system according to the first embodiment.

FIG. 11 is a flowchart showing a flow of an operation monitoring (charging) process performed in the platooning operation system (service center) according to the first embodiment.

FIG. 12 is a diagram showing an aspect example of a platooning operation system according to a second embodiment.

FIG. 16 is functional block diagram showing a service center (server) according to the second embodiment.

FIG. 18 is a table showing an example of operation timetable information in the platooning operation system according to the second embodiment.

FIG. 19 is a table showing an example of application information in the platooning operation system according to the second embodiment.

FIG. 20 is a table showing an example of registered vehicle information in the platooning operation system according to the second embodiment.

FIG. 21 is a table showing an example of registered driver information in the platooning operation system according to the second embodiment.

FIG. 22 is a first diagram illustrating a platoon organization rule in the platooning operation system according to the second embodiment.

FIG. 23 is a second diagram illustrating a platoon organization rule in the platooning operation system according to the second embodiment.

FIG. 24 is a table showing an example of schedule information in the platooning operation system according to the second embodiment.

FIG. 25 is a flowchart showing a flow of an operation schedule generation process performed in the platooning operation system (service center) according to the second embodiment.

DETAILED DESCRIPTION

Embodiments will be described hereinafter with reference to the accompanying drawings.

In general, according to one embodiment, a platooning operation system organizes a platoon by making a plurality of vehicles cooperate. The platooning operation system includes an application acceptance processor and a platoon organization processor. The application acceptance processor accepts an application of a vehicle for admission to the platoon. The platoon organization processor which selects a platoon to which the vehicle is to be admitted or determines possibility of admission of the vehicle to the platoon, based on at least one of information on a driver driving the vehicle and information on the vehicle.

First Embodiment

First, a first embodiment will be described.

Figure 1:
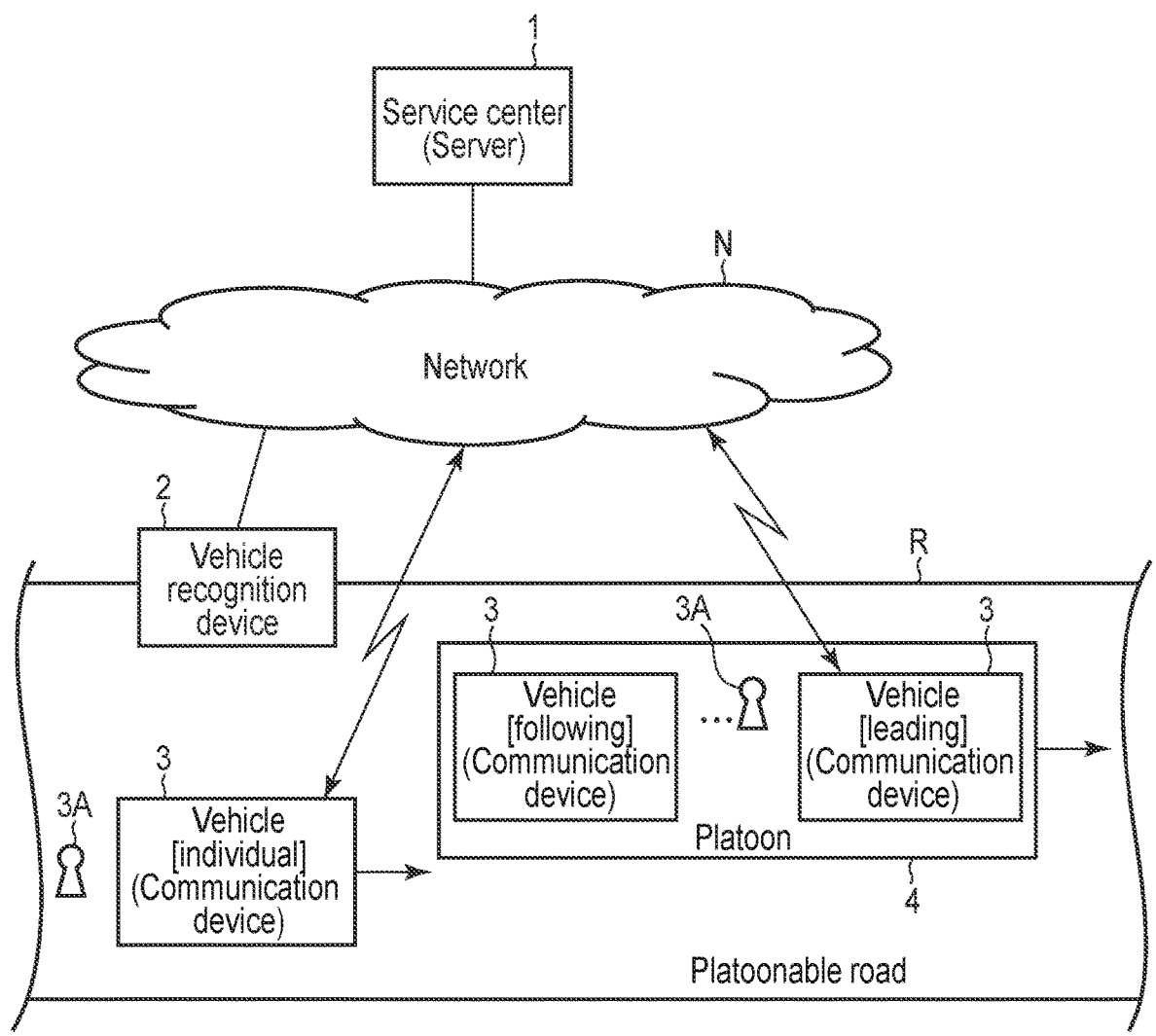
FIG. 1 is a diagram showing an aspect example of a platooning operation system according to a first embodiment.

FIG. 1 is a diagram showing an aspect example of a platooning operation system according to the present embodiment.

This platooning operation system is a system centrally managed by a service center 1 or, more specifically, a computer called, for example, a server or the like installed in the service center 1. The server is a computer comprising at least a processor (CPU: Central Processing Unit), a communication device, and a storage device, and its configuration is not limited. As the computer installed in the service center 1 as the server, one computer or, for example, a plurality of computers cooperating for load distribution or the like may be installed. A schematic hardware configuration example of the server will be described later with reference to FIG. 4.

The service center 1 provides a service of causing a plurality of vehicles 3 running on, for example, a road which enables platooning such as an expressway (hereinafter referred to as a platoonable road R) and where vehicle recognition devices 2 for recognizing the vehicles 3 are, for example, provided with regular intervals, to cooperate to organize a platoon 4. The service center 1 accepts an application to require joining to a platoon 4 from a vehicle 3 (more specifically, a communication device mounted on the vehicle 3 or carried by a driver 3A of the vehicle 3) via a network N such as the Internet. In addition, the service center 1 receives information on the vehicles 3 running on the platoonable road R from the vehicle recognition devices 2 provided on the platoonable road R. This information includes, for example, identification information, positions, traveling directions and the like of the vehicles 3. Furthermore, the service center 1 can perform communication with the vehicle 3 leading the platoon 4 to instruct, for example, causing a new vehicle 3 to cooperate via the network N.

When accepting an application to require admission to the platoon 4 from a certain vehicle 3, the service center 1 determines presence of the platoon 4 which the vehicle 3 is made to cooperate, and performs selection of the platoon 4 which the vehicle 3 is made to cooperate. As shown in FIG. 2, for example, when a plurality of platoons 4 (platoon A and platoon B) run in the vicinity of the vehicle 3 which runs on the platoonable road R and which has applied for admission to the platoons 4, the service center 1 determines possibility of cooperation of the vehicle to each platoon 4 and determines which platoon 4 the vehicle is made to cooperate. When determining that the vehicle 3 can be admitted to either platoon 4, the service center 1 transmits an instruction to both the vehicle 3 which applies for admission to the platoon 4 and the vehicle 3 leading the platoon 4 to which the vehicle 3 is to be admitted, to make both the vehicles cooperate. The vehicle 3 which has applied for admission to the platoon 4 is admitted to the platoon A (FIG. 2: a1) or the platoon B (FIG. 2: a2) under control of the service center 1.

In the platooning operation system of the present embodiment, the service center 1 performs control on the organization of the platoon 4 to admit the vehicle 3 which applies for admission to the platoon 4 to the platoon 4 suitable for the vehicle 3, and performs the control based on at least one of the information on the vehicle 3 and the information on the driver 3A. This point will be described later in detail.

The manner for a plurality of vehicles 3 to cooperate to travel as the platoon 4 will not be limited here. For example, platooning may be implemented by establishing communication between the vehicle 3 leading the platoon 4 and the vehicle 3 following this vehicle 3 or may be implemented by making the following vehicle 3 track the autonomously preceding vehicle 3 with various sensors. In addition, the vehicle 3 leading the platoon 4 is not necessarily limited to a vehicle running at the lead position.

Figure 3:
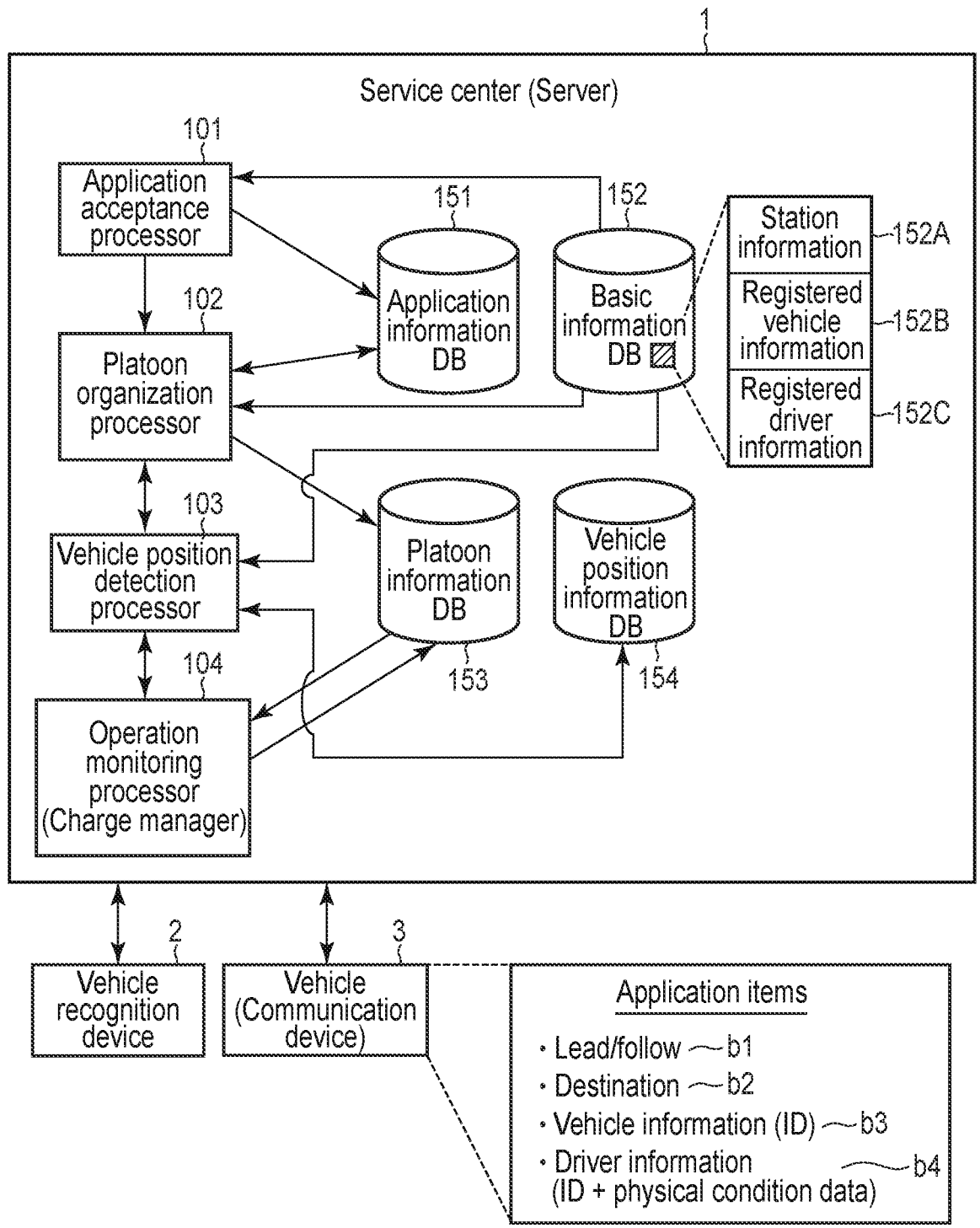
FIG. 3 is functional block diagram showing a service center (server) according to the first embodiment.

FIG. 3 is a functional block diagram of the service center (server) 1 according to the present embodiment.

As shown in FIG. 3, the service center 1 comprises each processing unit, i.e., an application acceptance processor 101, a platoon organization processor 102, a vehicle position detection processor 103, and an operation monitoring processor 104, and each data unit, i.e., an application information DB (DataBase) 151, a basic information DB 152, a platoon information DB 153, and a vehicle position information DB. The operation monitoring processor 104 also functions as a charge manager.

The processing of the service center 1 is roughly divided into two phases, i.e., (1) a phase of accepting an application of the vehicle 3 for admission to the platoon 4 and organizing the platoon 4, and (2) a phase of monitoring a running situation of the column 4 and calculating the amount of a bonus or charge to the vehicle 3 running as the platoon 4. The application acceptance processor 101, column organization processor 102 and vehicle position sensing processor 103 are equivalent to (1), and the service monitoring processor 104 which also functions as a charge manager copes with (2).

Figure 4:
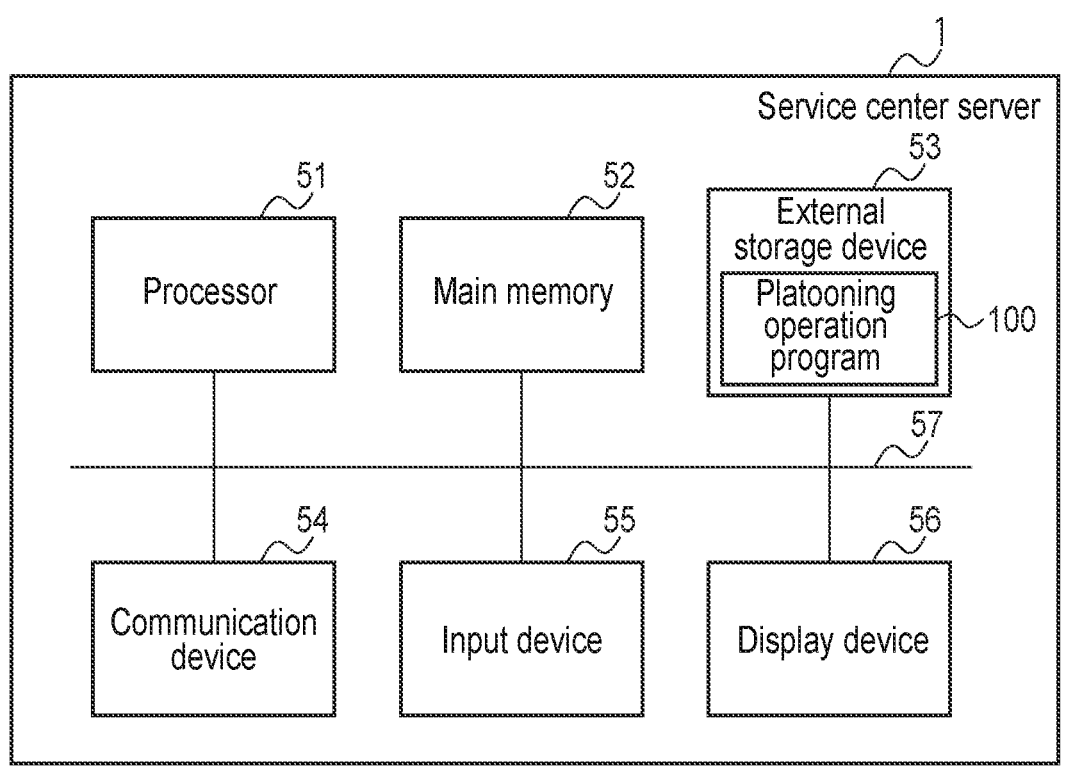
FIG. 4 is a diagram showing an example of a hardware configuration of the service center (server) according to the first embodiment.

As described above, the server is a processor comprising at least a processor, a communication device, and a storage device. Each of the processing units is constructed by causing the program stored in the storage device to run by the processor. In addition, each of the data units is constructed on the storage device. FIG. 4 shows an example of a hardware configuration of the service center (server) 1.

As shown in FIG. 4, the service center (server) 1 comprises a processor 51, a main memory 52, an external storage device 53, a communication device 54, an input device 55, a display device 56, and the like. These are interconnected via a bus 57. As described above, the platooning operation system may be constructed by a plurality of computers. FIG. 4 schematically illustrates the hardware configuration example alone.

It is assumed that in the platooning operation system, a platooning operation program 100 stored in the external storage device 53 is loaded from the external storage device 53 to the main memory 52 and run by the processor 51 and each of the processing units shown in FIG. 3 is thereby implemented. In addition, each of the data units shown in FIG. 3 is assumed to be constructed in the external storage device 53.

The communication device 54 is, for example, a device which performs communication with the vehicle recognition devices 2 or the vehicles 3 shown in FIG. 1. The input device 55 is a device for allowing an operator and the like managing the platooning operation system to perform the information input including commands. The display device 56 is a device for performing information output to the operator and the like.

The description returns to FIG. 3 to continue.

The application acceptance processor 101 performs a process of accepting the application for admission to the platoon 4 from the vehicle 3. As shown in FIG. 3, application items include "lead/follow" (b1), "destination" (b2), "vehicle information (ID: Identification Data)" (b3), "driver information (ID+physical condition data)" (b4), and the like. These application items are desirably input by voice by the driver 3A of the vehicle 3. In other words, the vehicle 3 (more specifically, the communication device built in the vehicle 3 or carried by the driver 3A driving the vehicle 3) desirably comprises a function of inputting these application items by voice and transmitting the application items to the service center 1.

The "lead/follow" (b1) is an item to designate applying for admission to the platoon 4 as the vehicle 3 leading the other vehicles 3 ("lead") or applying for admission to the platoon 4 as the vehicle 3 following the other vehicles 3 ("follow"). When designating "lead", the driver 3A of the vehicle 3 is positioned as a person for leading the platoon 4. For example, the vehicle 3 (driver 3A) can obtain a reward in accordance with the lead time, lead distance, and the like of the platoon 4. This platooning operation system thereby enables the driver to be easily secured as the person for leading the platoon 4. In contrast, when specifying "follow", the vehicle 3 (driver 3A) is assumed to be charged in accordance with, for example, the time when the vehicle is admitted to the platoon 4, the time when the vehicle travels in a state of being admitted to the platoon 4.

The "destination" (b2) is an item to specify a destination on the platoonable road R on which the vehicle runs as the platoon 4. The designated destination may not match the destination at which each of the vehicles aims. For example, a point before the destination at which each of the vehicles aims.

The "vehicle information (ID)" (b3) is an item to specify, for example, identification information and the like of the vehicle 3 assigned when the vehicle 3 is registered to the service center 1. In addition, the "driver information (ID+ physical condition data)" (b4) is an item to specify, for example, identification information and the like of the driver 3A assigned when the driver 3A is registered to the service center 1. That is, in this platooning operation system, the vehicle 3 which can be admitted to the platoon 4 and the driver 3A which can drive the vehicle 3 are assumed to be registered to the service center 1 in advance.

In addition, the "driver information (ID+physical condition data)" (b4) desirably includes, for example, information indicative of detection of alcohol, and the like. For example, the vehicle 3 (more specifically, the communication device built in the vehicle 3 or carried by the driver 3A driving the vehicle 3) desirably comprises a function of detecting alcohol in breath of the driver 3A and transmitting the result to the service center 1 when inputting each application item shown in FIG. 3 by voice. Moreover, the "driver information (ID+physical condition data)" (b4) may include information indicating how long time has elapsed after the vehicle 3 starts running, i.e., the drive time of the driver 3A, and the like.

In addition, as for either or both of the "vehicle information (ID)" and the "driver information (ID)", fixed values may be transmitted to the service center 1 for each vehicle 3 (more specifically, the communication device built in the vehicle 3 or carried by the driver 3A driving the vehicle 3).

The application acceptance processor 101 determines validity of the application items transmitted from the vehicle 3, by using the basic information DB 152 and, when determining that the application items are valid, stores the whole application items as the application information in the application information DB 151. An example of the application information stored in the application information DB 151 is shown in FIG. 5. The application acceptance processor 101 assigns acceptance numbers (acceptance No.) to the respective applications, and stores the whole application items transmitted from the vehicle 3 as the application information, in the order of the acceptance numbers, in the application information DB 151, as shown in FIG. 5. Incidentally, "platoon admission status" is included in the application information included in the application information DB 151. This "platoon admission status" will be described later.

Station information 152A, registration information 152B, and registered driver information 152C are stored in the basic information DB 152. The station information 152A includes information on a point which can be designated as the destination, and the like, and the application acceptance processor 101 determines, for example, whether the designation of the destination is valid or not, and the like, based on the position and traveling direction of the vehicle 3 which applies for attendance to the platoon 4 detected by the vehicle position detection processor 103 to be described later. When determining that the application items are invalid, the application acceptance processor 101 returns an error to the vehicle 3. In addition, for example, when "lead" is designated and when the "driver information (physical condition data)" indicative of the drive time exceeding a reference value is transmitted, the application acceptance processor 101 returns an error to the vehicle 3.

FIG. 6 shows an example of the registration information 152B, and FIG. 7 shows an example of the registered driver information 152C. Incidentally, various manners can be employed as manners of generating the registration information 152B and the registered driver information 152C and storing the generated information in the basic information DB 152, and the manners are not limited to a specific manner.

The registered vehicle information 152B includes, for example, identification information [vehicle ID] and a plurality of elements of attribute information, of the vehicles 3, as shown in FIG. 6. The plurality of elements of attribute information can include, for example, various information such as the weight, the overtaking acceleration, the deceleration/braking force, the friction force of tires. The overtaking acceleration is not an acceleration at which, for example, the vehicle 3 in a stopping status reaches a first speed assumed as the speed of the vehicle 3 in an ordinary run, but an acceleration at which the vehicle 3 at the first speed reaches a second speed required to overtake the other vehicle 3 running at the first speed. In addition, a performance evaluation value obtained by evaluating the performance of the vehicle 3 based on these elements of attribute information is also included as one of the plurality of elements of attribute information. Incidentally, various manners can be employed as manners of evaluating the performance of the vehicle 3, and the manners are not limited to a specific manner.

In addition, the plurality of elements of attribute information can include information on a driver's license required to drive the vehicle 3. Furthermore, the plurality of elements of attribute information can include information indicative of taking out an insurance, information indicative of the type of the insurance to be taken out, and the like.

The registered driver information 152C includes, for example, identification information [driver ID] and a plurality of elements of attribute information, of the drivers 3A, as shown in FIG. V. The plurality of elements of the attribute information include at least information on qualifications ((ordinary, medium-sized or large-sized vehicle) driver's license, a trailer license, a fork lift operator, slinging operator, mobile crane driver, various hazardous materials engineer, various high pressure gas manufacturing manager, filling operator, and the like). In addition, the plurality of elements of the attribute information can include, for example, various information such as experience years, counts of platooning (lead) in each section of the platoonable road R, an evaluation value on the communication ability, etc.

The platoon organization processor 102 organizes the platoon, using the application information DB 151 and the basic information DB 152, and stores information (platoon information) on the organized platoon 4 in the platoon information DB 153.

Every time the application is accepted by the application acceptance processor 101, the platoon organization processor 102 first performs a process of organizing the platoon 4. In other words, when accepting the application from the vehicle 3, determining that the application is valid and storing the application information in the application information DB 151, the application acceptance processor 101 performs the notice to the platoon organization processor 102. Every time the platoon organization processor 102 receives this notice, the platoon organization processor 102 performs a process of organizing the platoon 4.

It is assumed here that an application for which "follow" is designated is accepted by the application acceptance processor 101. In this case, the platoon organization processor 102 performs a process of admitting the vehicle 3 to either platoon 4.

The platoon organization processor 102 acquires a position of the vehicle 3 applying for admission to the platoon 4 from the vehicle position detection processor 103. The vehicle position detection processor 103 notifies all the vehicle recognition devices 2 dotted on the platoonable road R of, for example, identification information, in the registered vehicle information 152B stored in the basic information DB 152 and collects information on the vehicle 3 which is registered in advance and which is running on the platoonable road R. The vehicle position detection processor 103 stores the collected information in the vehicle position information DB 154. The vehicle position detection processor 103 reads a position of the vehicle 3 specified by the platoon organization processor 102 from the vehicle position information DB 154 and transmits the position to the platoon organization processor 102.

The platoon organization processor 102 retrieves the platoon 4 that is to be a candidate to which the vehicle 3 applying for admission to the platoon 4 is admitted, from the platoon information DB 153, based on the position acquired from the vehicle position detection processor 103. FIG. 8 shows an example of information (platoon information) on the platoon 4 stored in the platoon information DB 153.

As shown in FIG. 8, the platoon information includes information indicative of each of "platoon ID", "destination", "current location", "number of organized vehicles", "leading vehicle", and "following vehicle". In addition, the information indicating the "leading vehicle" includes each of "vehicle ID", "driver ID", and "leading time", and the information indicative of the "following vehicle" includes information indicative of each of "vehicle ID", "driver ID", and "following time".

The platoon information is generated by the platoon organization processor 102 and stored in the platoon information DB 153 when an application for which "lead" is specified is accepted by the application acceptance processor 101. The platoon organization processor 102 assigns the platoon ID at each application, generates the platoon information including the only information on the vehicle 3 which has performed the application, and stores the platoon information in the platoon information DB 153. At this time, the "number of organized vehicles" in the platoon information is indicative of 1, and the "vehicle ID" and the "driver ID" of the "leading vehicle" indicate the identification information of the vehicle 3 and the identification information of the driver 3A driving the vehicle 3.

The "current location" of the platoon information is periodically updated by the operation monitoring processor 104. More specifically, the drive monitoring processor 104 periodically acquires the location of the vehicle 3 indicated by the "vehicle ID" of the "leading vehicle" of the platoon information from the vehicle position detection processor 103, and periodically performs updating the platoon information to indicate the acquired location. The platoon organization processor 102 retrieves the platoon 4 that can be a candidate to which the vehicle 3 applying for admission to the platoon 4 is to be admitted, from the platoon information DB 153 thus updated.

For example, the platoon organization processor 102 retrieves the platoon which runs near the vehicle 3 applying for admission to the platoon 4 and in which the number of organized vehicles does not reach the maximum number of cooperations. When retrieving at least one platoon 4, the platoon organization processor 102 determines whether the vehicle 3 applying for admission to the platoon 4 can be admitted to the retrieved platoon 4 or not, based on the information on the vehicle 3 applying for admission to the platoon 4 and the driver 3A driving the vehicle 3, and the information on the vehicle 3 leading the platoon 4 and the driver 3A driving the vehicle 3.

For example, the platoon organization processor 102 may determine whether the vehicle 3 applying for admission to the platoon 4 can be admitted to the platoon 4 or not, by checking whether the driver 3A of the vehicle 3 applying for admission to the platoon 4 owns a license required to drive the vehicle 3 leading the platoon 4 or not. For example, when the vehicle 3 leading the platoon 4 needs to be replaced due to some circumstance, a situation of leading the vehicle 3 which requires a certain driver's license by the vehicle 3 driven by a driver 3A who does not own the driver's license can be avoided by the determination.

In addition, the platoon organization processor 102 may determine whether the vehicle 3 applying for admission to the platoon 4 can be admitted to the platoon 4 or not, by checking, for example, whether taking out an insurance of the vehicle 3 leading the platoon 4 matches taking out an insurance of the vehicle 3 applying for admission to the platoon 4 or not. By this determination, for example, efficiency of a response to a case where the platoon 4 is involved in an accident can be attempted. Furthermore, whether the vehicle 3 can be admitted to the platoon 4 or not may be determined by checking matching of the type of the insurance to be taken out.

In addition, the platoon organization processor 102 may determine whether the vehicle 3 applying for admission to the platoon 4 can be admitted to the platoon 4 or not, by checking, for example, whether the performance of the vehicle 3 leading the platoon 4 and that of the vehicle 3 applying for admission to the platoon 4 are in the same rank or not. By this determination, for example, a situation that the vehicle 3 having a higher performance needs to run in accordance with the vehicle 3 having a lower performance can be avoided.

In addition, the platoon organization processor 102 can determine whether the vehicle 3 applying for admission to the platoon 4 can be admitted to the platoon 4 or not, based on various standards, using at least one of the information on the vehicle 3 and the information on the driver 3A.

When determining that the vehicle 3 applying for admission to the platoon 4 to be admitted to a certain platoon 4, the platoon organization processor 102 transmits instructions to the vehicle 3 which applies for admission to the platoon 4 and the vehicle 3 leading the platoon 4 to which the vehicle 3 is to be admitted, to make both the vehicles cooperate. Then, the platoon organization processor 102 updates the platoon information on the platoon 4 stored in the platoon information DB 153. More specifically, the platoon organization processor 102 increments the "number of organized vehicles" by 1 and records the information on the newly added vehicle 3 in the "following vehicles" (cf. FIG. 8).

In addition, at this time, the platoon organization processor 102 also performs updating the application information on the vehicle 3 stored in the application information DB 151. More specifically, the platoon organization processor 102 records the "platoon admission status" (cf. FIG. 5). When the platoon organization processor 102 retrieves the platoon 4 which runs to the destination and which allows the vehicle 3 to be admitted, the platoon organization processor 102 determines the vehicle 3 to be admitted to the platoon 4 and records the determination as the "platoon admission status" (1: to destination). In contrast, when the platoon organization processor 102 does not retrieve the platoon 4 which allows the vehicle 3 to be admitted, but retrieves the platoon 4 running in the middle, the platoon organization processor 102 determines the vehicle 3 to be admitted to the platoon 4 and records the determination as the "platoon admission status" (2: to the middle). When no platoon 4 is retrieved, updating is not performed and the "platoon admission status" remains the initial value (0: unadmitted).

Figure 9:
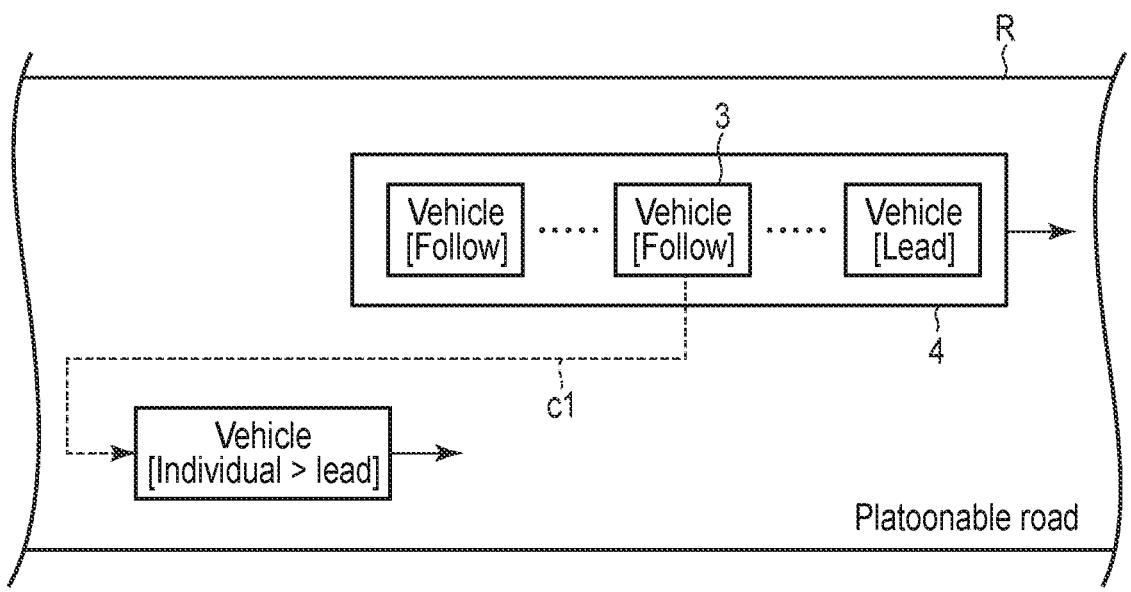
FIG. 9 is a diagram showing an example of re-organization of a platoon performed in the platooning operation system according to the first embodiment.

When the application for which "lead" is designated is accepted by the application acceptance processor 101, the platoon organization processor 102 attempts organizing the platoon 4 by retrieving the vehicle 3 which is running near the vehicle 3 having made the application and which can cooperate with the vehicle 3, of vehicles 3 whose "platoon admission status" is "0" or "2". The platoon organization processor 102 acquires the location where the vehicle 3 of "0" or "2" is running, from the vehicle position detection processor 103. As shown in, for example, FIG. 9, the platoon organization processor 102 can thereby make the vehicle 3 to be admitted to a certain platoon 4, in the status "2: to the middle", separate from the platoon 4 and cooperate with the other vehicle 3 making new application (FIG. 9: c1).

In addition, when making the other vehicle 3 cooperate with a certain vehicle 3, the platoon organization processor 102 notifies the operation monitoring processor 104 of the cooperation. The operation monitoring processor 104 receiving this notice starts measuring the "leading time" of the "leading vehicle", and the "following time" of the "following vehicle", in relation to the platoon 4, which are stored in the platoon information DB 153. The operation monitoring processor 104 which also functions as the charge manager 104 calculates the reward for driving the vehicle 3 leading the platoon 4 and the charge amount for being admitted to the platoon 4, based on these times.

Figure 10:
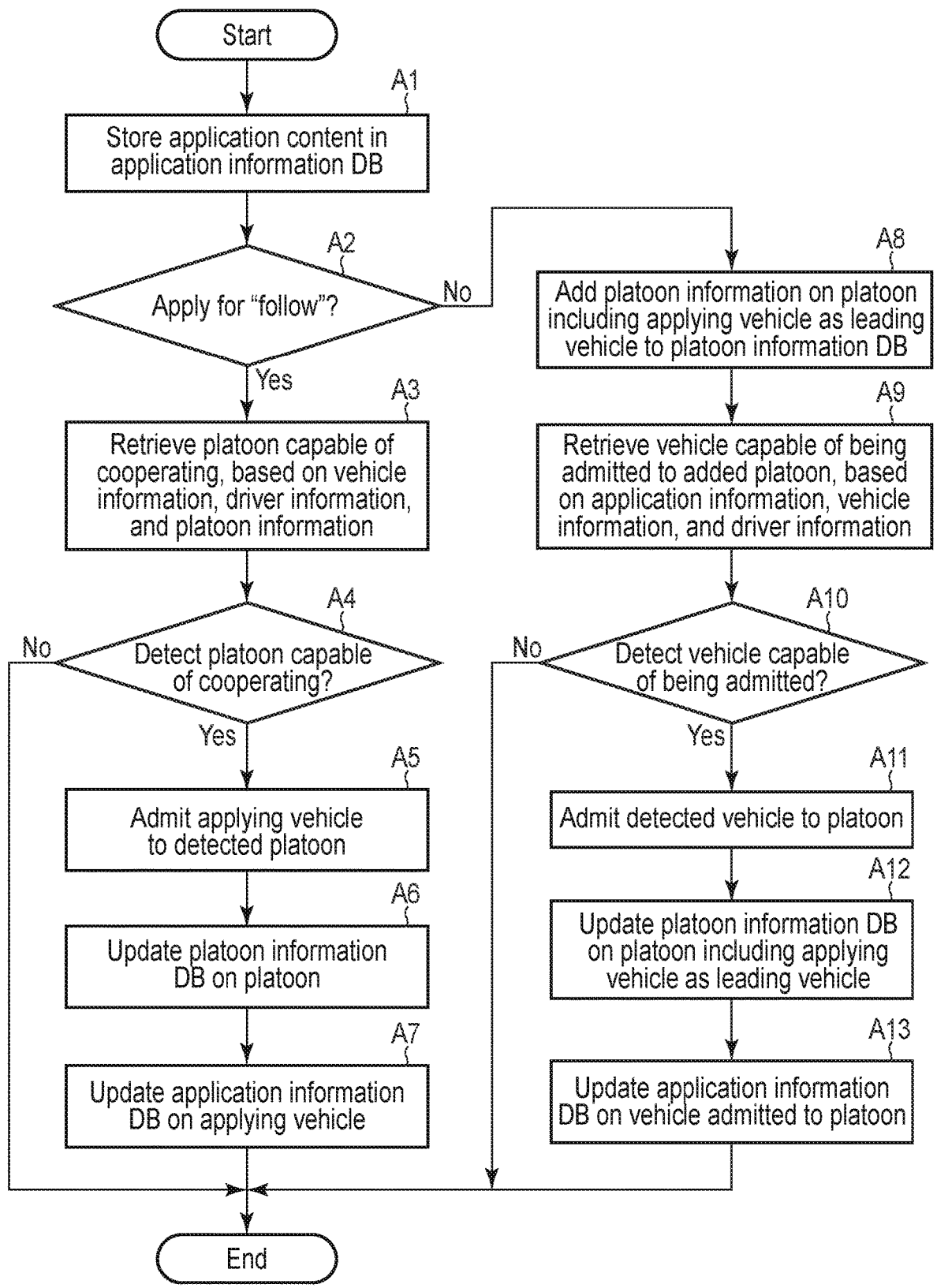
FIG. 10 is a flowchart showing a flow of a platoon organization process performed in the platooning operation system (service center) according to the first embodiment.

FIG. 10 is a flowchart showing a flow of the platoon organization process performed in the platooning operation system (service center 1).

The service center 1 first stores in the application information DB 151 from the vehicle 3 applying for admission to the platoon 4 (step A1). When the application content is application of "following" (step A2: YES), the service center 1 retrieves the platoon 4 which can cooperate the vehicle 3, based on the registered vehicle information 152B and the registered driver information 152C stored in the basic information DB 152, and the platoon information stored in the platoon information DB 153 (step A3).

When retrieving the platoon 4 (step A4: YES), the service center 1 admits the vehicle 3 to the retrieved platoon 4 (step A5), updates the platoon information DB 153 on the platoon 4 (step A6), and updates the application information DB 151 on the vehicle 3 (step A7). In contrast, when the platoon 4 is not retrieved (step A4: NO), the service center 1 finishes the platoon organization process resulting from this application.

In addition, when the application content is application of "leading" (step A2: NO), the service center 1 adds the platoon information on the platoon 4 including the vehicle 3 as the leading vehicle, to the platoon information DB 153 (step A8). Then, the service center 1 retrieves the vehicle 3 which can be admitted to the added platoon 4, based on the application information stored in the application information DB 151, and the registered vehicle information 152B and the registered driver information 152C stored in the basic information DB 152 (step A9).

When retrieving the vehicle 3 (step A10: YES), the service center 1 admits the vehicle 3 to the platoon 4 (step A11), updates the platoon information DB 153 on the platoon 4 (step A12), and updates the application information DB 151 on the vehicle 3 (step A13). In contrast, when the platoon 4 is not retrieved (step A10: NO), the service center 1 finishes the platoon organization process resulting from this application.

In addition, FIG. 11 is a flowchart showing a flow of an operation monitoring (charging) process performed in the platooning operation system (service center 1).

The service center 1 measures a leading time of the vehicle 3 leading the platoon 4 (step B1), and measures a following time of the vehicle 3 admitted to the platoon 4 (step B2). Then, the service center 1 calculates the reward or the charge amount of each vehicle 3, based on the measured leading time or following time (step B3).

Thus, in the platooning operation system of the present embodiment, the service center 1 performs control on the operation of the platoon 4 to admit the vehicle 3 applying for admission to the platoon 4, to the platoon 4 suitable for the vehicle 3, based on at least one of the information on the vehicle 3 and the information on the driver 3A.

That is, the platooning operation system of the present embodiment can appropriately operate the platoon, based on, for example, the information on the driver and the information on the vehicle.

It is assumed in the above descriptions that the driver 3A rides in the vehicle 3 of the platoon 4. However, when several or all vehicles 3 of the platoon 4 are driven in an unmanned autonomous manner, the operation of the platoon 4 may be controlled based on the only information on the vehicles 3.

Second Embodiment

Next, a second embodiment will be described.

Recently, the amount of distribution has increased in accordance with expansion of Internet shopping markets, and the like. In contrast, lack of drivers of trucks playing a main role for the distribution becomes more severe. For example, platooning that one manned truck runs while leading a plurality of unmanned trucks has been noticed as one of measures to such a situation.

When a platoon is organized by mixing trucks from a plurality of logistic companies, a platform system for adaptively organizing a platoon in which, for example, assignment of a driver of a vehicle leading the platoon or the like is considered, is required.

The present embodiment relates to a platooning operation system capable of adaptively organizing a platoon in which, for example, assignment of a driver of a vehicle leading the platoon or the like is considered.

FIG. 12 is a diagram showing an aspect example of a platooning operation system according to the present embodiment.

This platooning operation system is a system centrally managed by a service center 1-2 or, more specifically, a computer called, for example, a server or the like installed in the service center 1-2. The server is a computer comprising at least a processor, a communication device, and a storage device, and its configuration is not limited. As the computer installed in the service center 1-2 as the server, one computer or, for example, a plurality of computers cooperating for load distribution or the like may be installed. A schematic hardware configuration example of the server will be described later with reference to FIG. 17.

The service center 1-2 accepts applications (application information) from, for example, business bases 2 of a plurality of logistic companies, more specifically, PCs (Personal Computers) installed in the business bases 2 via a network N such as the Internet. The application information is the information to admit a target truck (vehicle 3) to the platoon 4 while specifying the desired date and time, desired section, and the like. For example, an applicant who is an employee of the business base 2, or the like, accesses a web page that the service center 1-2 releases on the network N, allows an application screen to be displayed on the PC, generates the application information by inputting necessary items on this application screen, and transmits the application information to the service center 1-2. The device to generate the application information is not limited to PC, but may be a device having a function of accessing the web page released on the network N, for example, a smartphone or the like. In addition, FIG. 12 shows a situation in which the service center 1-2 makes communication with the business bases 2 of the logistic companies. The applicant is not limited to the employee of business base 6, or the like, but may be an individual. Furthermore, the vehicle 3 admitted to the platoon 4 is not limited to the truck of the logistic company, but may be, for example, a private automobile of the individual.

In addition, the service center 1-2 can make communication with, for example, a vehicle 3 to be admitted to the platoon 4 or a vehicle 3 to lead the platoon 4 after admission to the platoon 4, more specifically, communication devices carried by drivers 3A of these vehicles 3, via the network N. By this communication, the service center 1 can acquire, for example, information on which vehicle 3 (driver 3A) is leading the platoon 4.

This platooning operation system is capable of adaptive organization of the platoon 4 considering, for example, assignment of the driver 3A of the vehicle 3 leading the platoon 4, using driver information on the driver 3A (a driver flag to be described below), vehicle information on the vehicle 3 (a vehicle flag to be described below), and platoon information on the platoon 4 (a platoon flag). An example of use of the information will be described below in detail.

Figure 13:
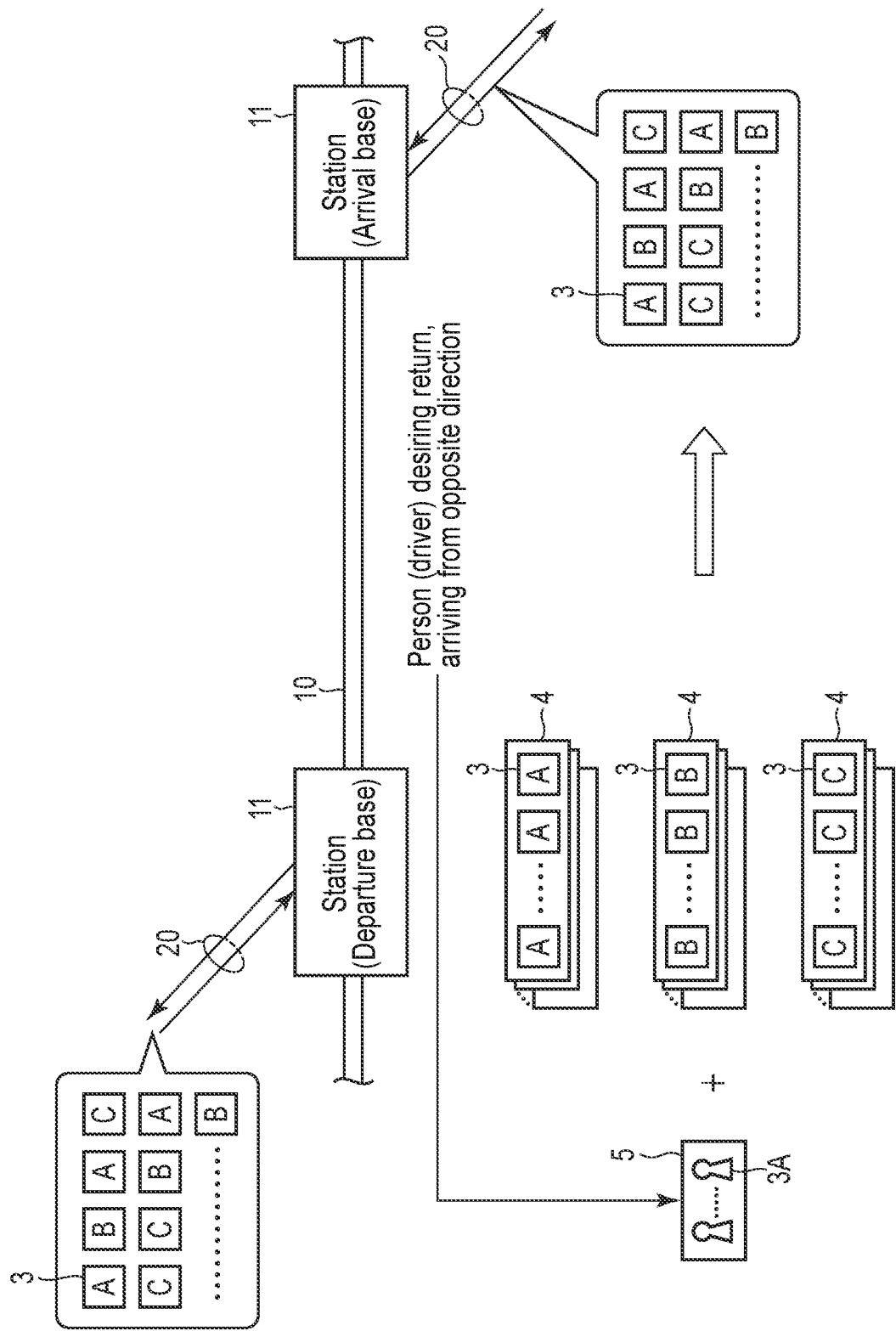
FIG. 13 is a diagram illustrating a summary of platooning of vehicles performed by the platooning operation system according to the second embodiment.

FIG. 13 is a diagram illustrating a summary of the vehicle platoon performed by this platooning operation system.

For example, an expressway or the like is assumed to be a road on which platooning can be performed, and is referred to as a platoonable road 10. In addition, for example, a general road or the like is assumed to be a road on which platooning cannot be performed, and is referred to as a non-platoonable road 20.

Furthermore, it is assumed that a plurality of stations 11 for forming or disassembling the platoon 4 are provided on the platoonable road 10. For example, the stations 11 are provided near interchanges which are exits and entrances of the platoonable road 10.

The platooning operation system organizes the platoon 4 by making vehicles 3 running between common two stations 11 cooperate. The vehicle 3 to be admitted to the platoon 4 runs on the non-platoonable road 20 to the station 11 of the departure base. That is, the driver 3A rides in each vehicle 3 to be admitted to the platoon 4. In the following descriptions, the station 11 of the departure base is often referred to as a departure station 11, and the station 11 of the arrival base is often referred to as an arrival station 11.

In addition, in the platooning operation system, the vehicle 3 and the driver 3A to be admitted to the platoon 4 are assumed to be registered in the service center 1 in advance. The information on registering the vehicle includes information for determining the performance. In FIG. 13, "A", "B", and "C" are indicative of performances of the vehicles 3. In this platooning operation system, the vehicles 3 to be admitted to the platoon 4 are grouped by performance to, for example, three stages "A: higher performance", "B: middle performance", and "C; lower performance" to organize platoons of the respective groups. Thus, variation in performances of the vehicles 3 in the platoon 4 is suppressed, waste of, for example, making the vehicle having the higher performance run in accordance with the vehicle 3 having the lower performance is eliminated, and efficient and stable platooning is implemented. Various manners can be employed as a manner of evaluating the performance of the vehicles. This manner is not limited to a specific manner.

The platoon 4 is organized by one vehicle 3 leading the platoon 4 and one or more vehicles 3 following this vehicle 3. The vehicle 3 leading the platoon 4 is a manned vehicle driven by the driver, and the following vehicles 3 are unmanned vehicles autonomously driven to follow preceding vehicles. Autonomous driving of the following vehicles 3 may be performed while communicating with the leading vehicle 3 or the preceding vehicle 3 or may be autonomously performed by various sensors. Various manners can be employed as a manner of making a plurality of vehicles 3 cooperate for platooning. This manner is not limited to a specific manner. In addition, it is assumed here that the vehicle 3 which can be admitted to the platoon 4 is equipped with a function of cooperating with the other vehicles 3, can become the vehicle 3 leading the platoon 4 or can become the following vehicle.

The vehicle 3 leading the platoon 4 is basically driven on the non-platoonable road 20 by a driver 3A of the drivers 3A driving the vehicles 3 to be admitted to the platoon 4 to the station 11. More specifically, the vehicle 3 is driven by the driver 3A riding in the vehicle 3 after admitted to the platoon 4 (i.e., the vehicle 3 driven by the driver 3A is the vehicle 3 leading the platoon 4). The driver 3A who does not ride in the vehicle after admitted to the platoon 4 may drive the vehicle 3 of the own company disassembled from the platoon 4 by considering the station 11 as the arrival base and move to the destination or may return to the company by a bus of the own company, or the like. The driver 3A disassembled from the vehicle 3 at the station 11 will not be described here. The vehicle 3 leading the platoon 4 is exceptionally driven by a driver 3B arranged by the service center 1 (referred to as a driver 3B to be distinguished from the driver 3A of the vehicle 3). The case where the driver 3B is arranged is the case where the number of the drivers 3A riding in the vehicles 3 after admitted to the platoon 4 does not reach the necessary number of persons to lead the platoon 4.

In addition, in the platooning operation system, a means for returning to the station 11 of the departure base after the platoon 4 is disassembled at the station 11 of the arrival base is prepared for the driver 3A who rides in the vehicles after admitted to the platoon 4 and who plays a role of the person for leading the platoon 4. Of course, the vehicle may run to the destination on the non-platoonable road 20 after the platoon 4 is disassembled at the station 11 of the arrival base. The case of returning to the station 11 of the departure base may be the case where, for example, the other driver of the own company in charge of an area around the station 11 of the arrival base takes over the vehicle 3. The other driver of the own company is indicative of a driver or the like, who drives the vehicle 3 to, for example, the above station 11 of the departure base (i.e., as seen from the driver 3A of the side of taking over, the station 11 of the arrival base), does not ride in the vehicle 3 but drives the vehicle 3 of the own company disassembled from the platoon 4 and travels to the destination by setting the station 11 as the arrival base, after admitted to the platoon 4. When the viewpoint is changed, the driver who rides in the vehicle 3 from the station 11 of the departure base to the station 11 of the arrival base on the platoonable road 10 is, for example, a driver who is in charge of an area around the station 11 of the departure base. The driver has only to drive on the non-platoonable road 20 around the station 11 of the departure base and the platoonable road 10, and does not need to drive on the non-platoonable road 20 around the station 11 of the arrival base outside the charge area.

In this platooning operation system, when a driver who wants to return from the station 11 of the departure base to the station 11 of the arrival base exists, a vehicle (for example, a bus or the like) 5 dedicated for personnel transport to carry the driver is prepared. In other words, the service center 1-2 performs arrangement of the vehicle 5 dedicated for personnel transport. The driver 3A who wants to return from the station 11 of the departure base to the station 11 of the arrival base is a driver 3A who has ridden in the vehicle 3 admitted to the platoon 4 traveling in the same section from the opposite direction and arriving at the station 11 of the departure base before the platoon 4 leaves the station 11 of the departure base.

When the platoon 4 arrives at the station 11 of the arrival base, the platoon 4 is disassembled and each of the vehicles 3 travels to the destination via the non-platoonable road 20. After disassembling the platoon 4, the driver of the vehicle 3 will not be described here. For example, the driver may continuously drive the vehicle 3 in which the driver 3 rides even after admission to the platoon 4. Alternatively, the other driver of the own company in charge of the area around the station 11 may take over the vehicle 3 in which the driver does not ride after admission to the platoon 4 or the vehicle 3 in which the driver rides after admission to the platoon 4 but by which the driver returns to the station 11 of the departure base after the platoon 4 is disassembled.

Next, a main use case of vehicle platooning performed by the platooning operation system will be described with reference to FIG. 14.

Figure 14:
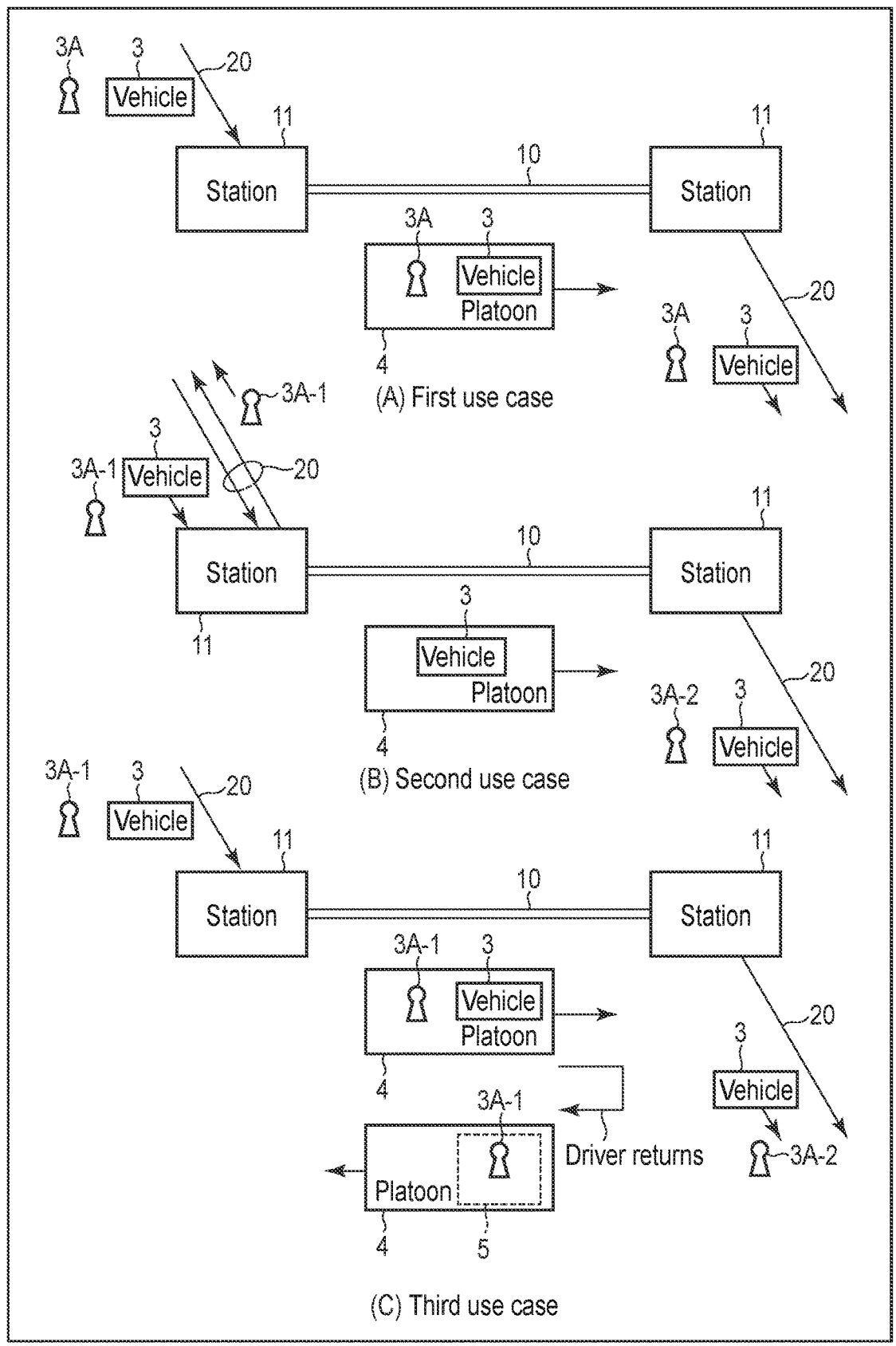
FIG. 14 is a diagram illustrating a main use case of platooning of vehicles performed by the platooning operation system according to the second embodiment.

As shown in FIG. 14, the vehicle platooning performed by the platooning operation system is considered to be roughly classified into three use cases.

(A) shows a first use case.

The first case is a case where the driver 3A driving the vehicle 3 to the station 11 of the departure base rides in the vehicle 3 after admitted to the platoon 4, and continuously drives the vehicle 3 and moves to the destination after the platoon 4 is disassembled at the station 11 of the arrival base. As described above, the driver riding in the vehicle 3 after admission to the platoon 4 plays a role of the person for leading the platoon 4.

In addition, (B) shows a second use case.

The second case is a case where the driver 3A driving the vehicle 3 to the station 11 of the departure base does not ride in the vehicle 3 after admitted to the platoon 4. That is, the unmanned vehicle 3 is led to the station 11 of the arrival base by the other vehicle 3. The vehicle 3 which arrives at the station 11 of the arrival base and is disassembled from the platoon 4 is, for example, driven to the destination by the other driver of the own company in charge of an area around the station 11, or the like, as described above. The unmanned vehicle 3 in the second use case can be used as the vehicle 3 leading the platoon 4 by the other person serving as the driver.

In addition, (C) shows a third use case.

The third case is a case where the driver 3A driving the vehicle 3 to the station 11 of the departure base rides in the vehicle 3 after admitted to the platoon 4, and then rides in a vehicle 5 dedicated for personnel transport which runs in an opposite direction in the same section and which is to admitted to the platoon 4, returns to the station 11 of the departure base after the platoon 4 is disassembled at the station 11 of the arrival base. In the third use case, too, the vehicle 3 is driven to the destination by the other driver of the own company in charge of an area around the station 11, or the like, similarly to the second use case.

The reason for setting the third use case where the driver 3A rides in the vehicle 3 after admitted to the platoon 4, besides the second use case, as the use case where, for example, the driver 3A in charge of an area around the station 11 of the departure base does not need to drive on the non-platoonable road 20 around the station 11 of the arrival base outside the charged area, will be explained. In addition, the reason for setting the first use case where the driver 3A does not drive the vehicle 3 by himself from the station 11 of the departure base to the station 11 of the arrival base, but becomes capable of leading the platoon 4 will be explained, too.

First, the first and third use cases are set from the viewpoint that a plurality of logistic companies cooperate to respond to the problem of lack of drivers. Second, the first and third use cases are set from the viewpoint that drivers can easily be secured. More specifically, it is assumed that a fee is collected in the second use case of only rending the vehicle 3 from the station 11 of the departure base to the station 11 of the arrival base while, in the first and third use cases, a consideration for positioning the driver 3A of the vehicle as the person for leading the platoon 4 can be obtained. The consideration in the first use case or the third use case is desirably calculated in accordance with driving or drive time at the platooning.

Figure 15:
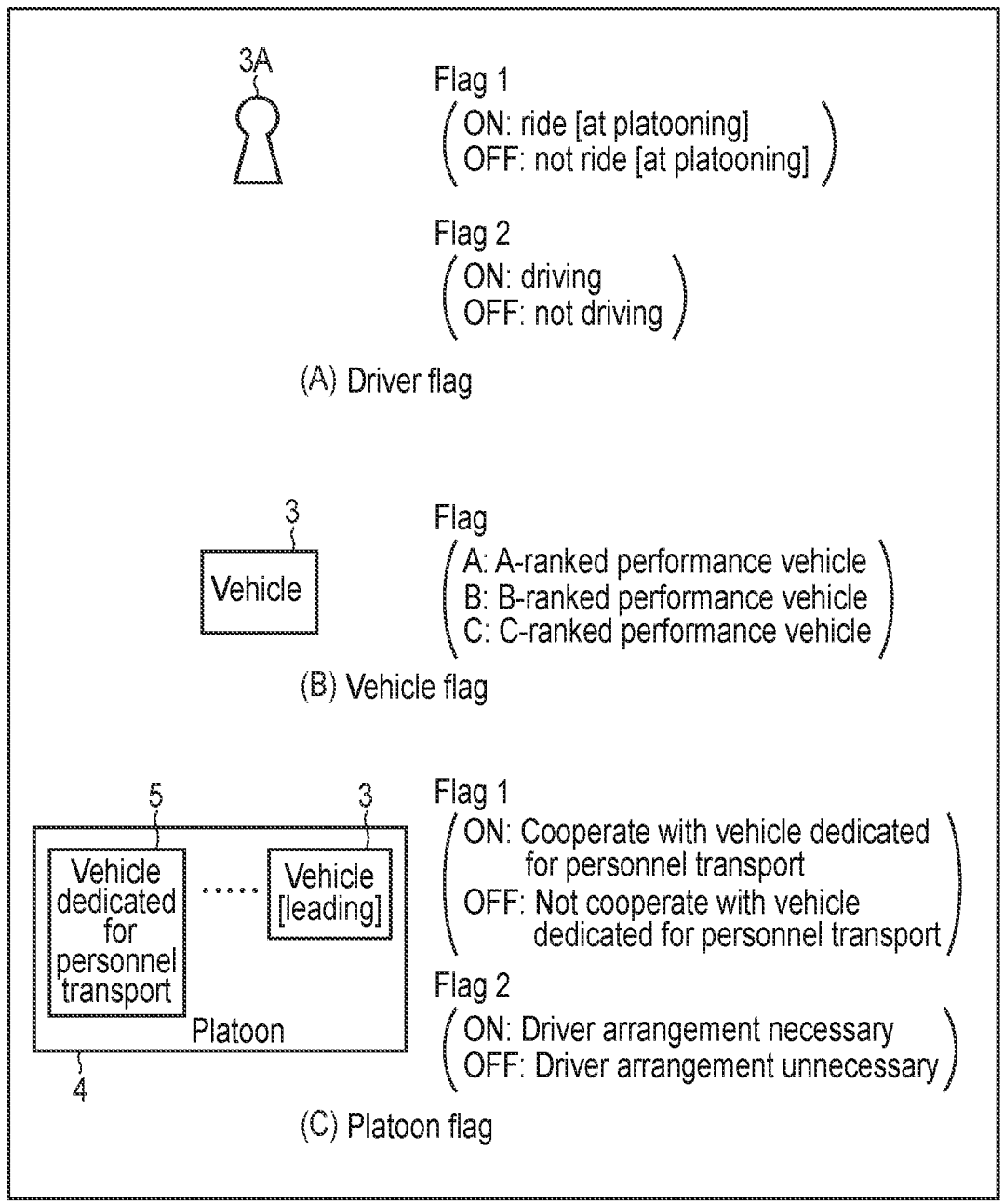
FIG. 15 is a diagram illustrating various information (flags) used to organize the platoon in the platooning operation system according to the second embodiment.

Next, various information (flags) used to organize the platoon 4 in the platooning operation system of the present embodiment that the first to third use cases occur will be described with reference to FIG. 15.

This platooning operation system uses (A) a driver flag that is the driver information on the driver 3A, (B) a vehicle flag that is the vehicle information on the vehicle 3, and (C) a platoon flag that is the platoon information on the platoon 4.

The driver flags include two types of driver flag (1) and driver flag (2). The driver flag (1) indicates whether the driver rides in the vehicle 3 at admission of the vehicle 3 to the platoon 4 or not. The driver flag (2) indicates whether the driver is driving as the driver of the vehicle 3 leading the platoon 4 at the platooning or not. The value of the driver flag (1) (ON [riding], OFF [not riding]) is determined at the application, and the value of the driver flag (2) (ON [driving], OFF [not driving]) is determined in accordance with the running condition of the platoon 4. The driver flag (1) is included in the application information stored in the application information DB 151 to be described later. The driver flag (2) is included in the platoon organization information 153A stored in the schedule DB 153 to be described later.

The vehicle flag is indicative of the performance of the vehicle 3. The values (A, B, and C) of the vehicle flag are determined at the registration of the vehicle 3. The vehicle flag is included in the registered vehicle information 152B stored in the basic information DB 152 to be described later.

The platoon flags include two types of platoon flag (1) and platoon flag (2). The platoon flag (1) indicates whether the vehicle 5 dedicated for personnel transport cooperates with the platoon or not. The platoon flag (2) indicates whether arrangement of the driver as the person for leading the platoon 4 is necessary or not. The value of the platoon flag (1) (ON [cooperating with the vehicle 5 dedicated for personnel transport] or OFF [not cooperating with the vehicle 5 dedicated for personnel transport]) is determined at the organization of the platoon 4, and the value of the platoon flag (2) (ON [driver arrangement necessary] or OFF [driver arrangement unnecessary]) is also determined at the organization of the platoon 4. The platoon flag (1) and the platoon flag (2) are included in the platoon organization information 153A stored in the schedule DB 153 to be described later.

FIG. 16 is a functional block diagram of the service center (server) 1-2 of to the present embodiment.

As shown in FIG. 16, the service center 1-2 comprises each processing units, i.e., an application acceptance processor 121, a platoon organization processor 122, a driver arrangement processor 123, a personnel transport dedicated vehicle arrangement processor 124, and an operation monitoring processor 125, and each data unit, i.e., an application information DB 171, a basic information DB 172, and a schedule DB 173. The platoon organization processor 122, the driver arrangement processor 123, and the personnel transport dedicated vehicle arrangement processor 124 constitute an operation schedule generation processor 130. In addition, the operation monitoring processor 125 also functions as a charge manager.

The processing of the service center 1-2 is roughly divided into four phases, i.e., (1) a phase of accepting an application of the vehicle 3 for admission to the platoon 4, (2) a phase of organizing the platoon 4, (3) a phase of monitoring a running situation of the column 4, and (4) a phase of charging the vehicle 3 running as the platoon 4. The application acceptance processor 121 corresponds to (1), and the platoon organization processor 122, the driver arrangement processor 123, and the personnel transport dedicated vehicle arrangement processor 124 constituting the operation schedule generation processor 130 correspond to (2). In addition, the operation monitoring processor 125 that also functions as a charge manager corresponds to (3) and (4).

Figure 17:
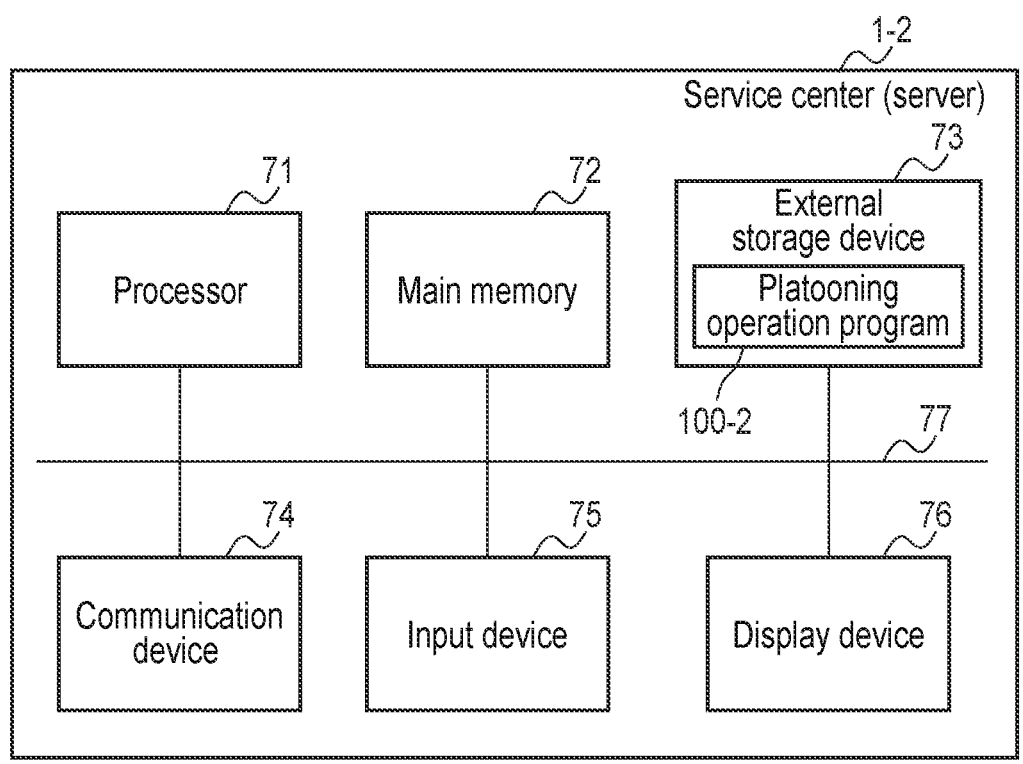
FIG. 17 is a diagram showing an example of a hardware configuration of the service center (server) according to the second embodiment.

As described above, the server is a processor comprising at least a processor, a communication device, and a storage device. Each of the processing units is constructed by causing the program stored in the storage device to run by the processor. In addition, each of the data units is constructed on the storage device. FIG. 17 shows an example of a hardware configuration of the service center (server) 1-2.

As shown in FIG. 17, the service center (server) 1-2 comprises a processor 71, a main memory 72, an external storage device 73, a communication device 74, an input device 75, a display device 76, and the like. These are interconnected via a bus 77. As described above, the platooning operation system may be constructed by a plurality of computers. FIG. 17 schematically illustrates the hardware configuration example alone.

It is assumed that in the platooning operation system, a platooning operation program 100-2 stored in the external storage device 53 is loaded from the external storage device 73 to the main memory 72 and run by the processor 71 and each of the processing units shown in FIG. 16 is thereby implemented. In addition, each of the data units shown in FIG. 16 is assumed to be constructed in the external storage device 73.

The communication device 74 is, for example, a device which performs communication with the business bases 2 or the vehicles 3 shown in FIG. 12. The input device 75 is a device for allowing an operator and the like managing the platooning operation system to perform the information input including commands. The display device 76 is a device for performing information output to the operator and the like.

The descriptions returns to FIG. 16 to continue.

The application acceptance processor 121 performs, for example, a process of accepting application information from a business base 2 of a logistic company, etc. The application reception processor 121 transmits information e.g., an HTML (HyperText Markup Language) file to cause an application screen 21 to be displayed on PC of the business base 2 which has accessed the service center 1. As shown in FIG. 16, input items on the application screen 21 include date (d1), departure station [departure S] (d2), arrival station [arrival S] (d3), departure or arrival time (d4), riding at platooning (d5), request for return to departure station at platooning (d6), identifier of vehicle 3A admitted to platoon 4 [vehicle ID] (d7), identifier of driver 3A of vehicle 3A [driver ID] (d8), and the like. In the input item of the departure or arrival time, which is represented by reference symbol d4, the applicant can desirably change the departure time or the arrival time as the input target.

In the input item of riding at the platooning, which is represented by reference symbol d5, not riding can be input when the driver 3A rides in the vehicle 3 admitted to the platoon 4. This case is handled as the above second use case (cf., FIG. 14(B)), and the driver 3A cannot be positioned as the person for leading the platoon 4. That is, this case can respond to a need of, for example, wishing to take a rest in the vehicle 3 at the platooning.

Making the vehicles 3 for which the departure station and the arrival station match and the desired time of the departure or arrival is within a certain range cooperate to organize the platoon 4 can be implemented. In this platooning operation system, however, it is assumed that the time schedule of the platoon 4 made to run on the platoonable road 10 is determined in advance. More specifically, it is assumed that the departure time of the platoon 4 and the arrival time to the other station 11 are determined in advance in both directions (inbound and outbound) of the platoonable road 10, for each station 11. The information of each station 11 is stored as operation timetable information 172A, in the basic information DB 172. FIG. 18 shows an example of operation timetable data 172A.

The operation timetable information 172A is the information provided at each station 11, indicating the departure time and the arrival time at the other station 11, in both the directions (inbound and outbound) of the platoonable road 10, as shown in FIG. 18.

By only designating one of the departure time and the arrival time, when the departure station and the arrival station are designated, the application acceptance processor 121 can obtain the other of the departure time and the arrival time, by the operation timetable information 172A. The application acceptance processor 121 stores the information input on the application screen 21 and transmitted from PC of the business base 6, or the like to the service center 1-2, as the application information, in the application information DB 171. An example of the application information stored in the application information DB 171 is shown in FIG. 19.

The application acceptance processor 121 assigns acceptance numbers (acceptance No.) to the respective applications, and stores the information input on the application screen 21 as the application information, in the order of the acceptance numbers, in the application information DB 171, as shown in FIG. 19. The information on riding at the platooning, of the information included in the application, becomes the value of the driver flag (1). That is, the application acceptance processor 121 sets the driver flag (1) in the application information to ON when the application is made while indicating riding at the platooning, and sets the driver flag (1) in the application information to OFF when the application is made while indicating not riding at the platooning.

In addition to operation timetable information 172A, registered vehicle information 172B and registered driver information 172C are stored in the basic information DB 172. Incidentally, various manners can be employed as manners of generating the registration information 172B and the registered driver information 172C and storing the generated information in the basic information DB 172, and the manners are not limited to a specific manner. FIG. 20 shows an example of the registered vehicle information 172B, and FIG. 21 shows an example of the registered driver information 172C.

The registered vehicle information 172B includes, for example, identification information [vehicle ID] and a plurality of elements of attribute information, of the vehicles 3, as shown in FIG. 20. The plurality of elements of attribute information can include, for example, various information such as the weight, the overtaking acceleration, the deceleration/braking force, the friction force of tires. The overtaking acceleration is not an acceleration at which, for example, the vehicle 3 in a stopping status reaches a first speed assumed as the speed of the vehicle 3 in an ordinary run, but an acceleration at which the vehicle 3 at the first speed reaches a second speed required to overtake the other vehicle 3 running at the first speed. In addition, the registered vehicle information 172B includes a performance evaluation value of evaluating the performance of the vehicle 3 based on the attribute information. The performance evaluation value, of the information included in the registered vehicle information 172B is the value of the vehicle flag.

The registered driver information 172C includes, for example, identification information [driver ID] and a plurality of elements of attribute information, of the drivers 3A, as shown in FIG. 21. The plurality of elements of the attribute information can include, for example, various information such as experience years, counts of platooning (leading) in each section of the platoonable road 10, an evaluation value on the communication ability, etc. For example, when more drivers 3A riding in the vehicles 3 than the necessary number exist after admission to the platoon 4, the registered driver information 152C is used as information for selecting a driver 3A as a person for leading the platoon 4 from the drivers 3A.

The platoon organization processor 122 organizes the platoon 4 with the application information stored in the application information DB 171, and the operation timetable information 172A, the registered vehicle information 172B, and the registered driver information 172C which are stored in the basic information DB 172, generates platoon organization information 173A that is the information on the organization of the platoon 4, and stores the platoon organization information 173A in the schedule DB 173. Incidentally, the platoon organization information 173A is used as, for example, achievement information indicative of leading (driving) the platoon 4 by the driver 3A, the leading time (drive time), and the like, when calculating the charging amount to the vehicle 3 admitted to the platoon 4.

For example, it is assumed that the service center 1-2 accepts applications for twenty-four hours but closes applications for each day at a predetermined time of the present day. In this case, after the predetermined time has passed, the platoon organization processor 102 performs a process of generating the platoon organization information 173A of the present day using the application information of the present day stored in the application information DB 171, as a daily process.

The platoon organization processor 122 first groups vehicles 3 applying for admission to the platoon 4 for each departure time and each performance, in relation to all combinations (considering directions, too) of two stations 11 on the platoonable road 10. Then, the platoon organization processor 122 accumulates the number of vehicles 3 for each of the generated groups. That is, the platoon organization processor 122 accumulates the number of vehicles 3 for each section, each departure time, and each performance. At this time, the vehicle flag included in the registered vehicle information 172B is used. Incidentally, the information on the generated groups is temporarily stored on a storage device of the service center (server) 1-2 as intermediate products. Identifiers of the vehicles 3 belonging to the groups are included in the information.

In addition, the platoon organization processor 122 accumulates the number of persons who want to return to the departure station 11 for each section and each departure time. More specifically, the service center 1-2 determines presence of the persons who want to return. When the person who wants to return exist, the platoon organization processor 122 assigns the vehicles 5 dedicated for personnel transport to the section and the opposite section, and the latest departure time elapsed from the arrival time for a certain period. The process of assignment of the vehicle 5 dedicated for personnel transport and the process of accumulation of the number of vehicles 3 may be performed parallel or may be performed sequentially. In addition, when the processes are performed successively, either of the processes may be first performed.

Subsequently, the platoon organization processor 122 organizes the platoons 4 for each section, each departure time, and each performance, based on the accumulation result of the number of vehicles 3 and the determination result of necessity of the vehicle 5 dedicated for personnel transport. Rules of organization of the platoon 4 by the platoon organization processor 122 will be described with reference to FIG. 22 and FIG. 23.

It is assumed that the maximum number of vehicles 3 that can cooperate to run as the platoon 4 is five. In addition, it is assumed that eighteen vehicles 3 that have a certain performance and that are to leave at a certain time in a certain section exist as shown in FIG. 22(A). That is, it is assumed that the number of vehicles 3 belonging to a certain group is eighteen.

In FIG. 22, reference symbol 3-1 is indicative of the vehicle 3 in which the information on riding at the platooning as included in the application information is indicative of riding, i.e., the vehicle 3 in which the driver flag (1) is set to ON. In contrast, reference symbol 3-2 is indicative of the vehicle 3 in which the information on riding at the platooning as included in the application information is not riding, i.e., the vehicle 3 in which the driver flag (1) is set to OFF. It is assumed that the drivers 3A of three vehicles 3 ride in the vehicles 3 even after admission to the platoon 4.

The platoon organization processor 122 obtains the number of platoons 4 to be organized in the group by dividing the number of vehicles 3 belonging to the group by the maximum number of vehicles 3 that can cooperate to run as the platoon 4. It can be recognized that four platoons 4 (4-1 to 4-4) are to be organized from 18/5=3.6.

When obtaining the number of platoons 4 to be organized, the platoon organization processor 122 equally assigns the vehicles 3 in which the driver flags (1) are set to ON to the platoons 4 and then assigns the vehicles 3 in which the driver flags (1) are set to OFF, as shown in FIG. 22(B). In addition, at this time, the platoon organization processor 102 assigns an identifier (platoon ID) to each platoon 4. Since the number of the vehicles 3 in which the driver flags (1) are set to ON is three, which is less than the number of the platoons 4, i.e., four, the driver 3A is absent in one platoon 4. In this case, the platoon organization processor 122 sets the platoon flag (2) to ON to indicate that arrangement of the driver is necessary, in the platoon 4 (4-4) where the driver 3A is absent. Setting the platoon flag (2) to ON is to set the information on the platoon 4 in the platoon organization information 173A stored in the schedule DB 173 so as to indicate that arrangement of the driver 3A is necessary.

Incidentally, the necessary number of drivers 3A has not been described as persons leading the platoons 4 to simplify the descriptions. According to the platoons 4, however, the scheduled run time of the platoon 4 may exceed the time for which one driver 3A can drive continuously. That is, the necessary number of drivers 3A can be obtained as the persons leading the platoons 4 by dividing the scheduled run time of the platoons 4 by the continuous drive time of one driver 3A. When the necessary number of drivers 3A is not met in a platoon 4 as a result of equally assigning the vehicles 3 in which the driver flags (1) are ON to the platoons 4, the platoon organization processor 122 sets the platoon flag (2) to ON so as to indicate that arrangement of the driver 3B is necessary for the platoon 4. The platoon flag (2) may be further indicative of the necessary number of drivers 3B.

Oppositely, the number of vehicles 3 in which driver flags (1) are set to ON may exceed the necessary number of drivers 3A. In this case, desirably, the platoon organization processor 122 calculates aptitudes of the respective drivers 3A in travel sections of the platoons 4 and sequences the aptitudes, based on the attribute information of the drivers 3A included in the registered driver information 172C, and equally assigns the drivers 3A of higher aptitudes to the platoons 4, based on the sequence. More specifically, the drivers 3A having higher aptitudes are desirably selected as the persons for leading the platoons 4.

In contrast, FIG. 23 is a diagram illustrating a case where the platoon flag (1) indicative of cooperation of the vehicle 5 dedicated for personnel transport is set to ON [cooperate with vehicle 5 dedicated for personnel transport]. When the vehicle 5 dedicated for personnel transport is determined to be necessary for a certain departure time of a certain section, the platoon organization processor 122 adds the vehicle 5 dedicated for personnel transport to a group where the platoon 4 in which the number of cooperations does not reach the maximum number, of the groups generated to correspond to the section and the departure time. That is, it is assumed here that the performance of the vehicle 5 dedicated for personnel transport is "A: high performance" and can cooperate with any groups classified by performance.

It is assumed that a certain group to which the vehicle 5 dedicated for personnel transport is added exists as shown in FIG. 23(A). In addition, it is assumed that the number of vehicles 3 in which driver flags (1) are set to ON exceeds the number of platoons 4. More specifically, it is assumed that no platoon 4 where the driver 3A is absent occurs.

The platoon organization processor 122 first equally assigns the vehicles 3 in which the driver flags (1) are set to ON to the platoons 4 as described above. Next, the platoon organization processor 122 assigns the vehicles 3 in which the driver flags (1) are set to OFF and the vehicle 5 dedicated for personnel transport, as shown in FIG. 23(B). The example of assigning the vehicles 3 in which the driver flags (1) are set to OFF and then assigning the vehicle 5 dedicated for personnel transport is shown in FIG. 23(B). However, the vehicle 5 dedicated for personnel transport may be first assigned. Furthermore, the vehicles 3 in which the driver flags (1) are set to OFF and the vehicle 5 dedicated for personnel transport do not need to be distinguished at all.

Since no platoon 4 in which the driver 3A is absent is generated, the platoon flag (2) is not set to ON in any platoons 4. In contrast, in the platoon 4 (4-3) assigned the vehicle 5 dedicated for personnel transport, the platoon organization processor 102 sets the platoon flag (1) to ON so as to indicate cooperating with the vehicle 5 dedicated for personnel transport. Setting the platoon flag (1) to ON is to set the information on the platoon 4 in the platoon organization information 173A stored in the schedule DB 173 so as to indicate cooperating with vehicle 5 dedicated for personnel transport.

Incidentally, the necessary number of vehicles 5 dedicated for personnel transport has not been described to simplify the descriptions. However, when the number of persons who want to return to the departure station 11 exceeds the capacity of the vehicle 5 dedicated for personnel transport, a plurality of vehicles 5 dedicated for personnel transport are required. The necessary number of vehicles 5 dedicated for personnel transport is determined by dividing the number of persons who want to return to the departure station 11 by the capacity of the vehicle 5 dedicated for personnel transport. When a plurality of vehicles 5 dedicated for personnel transport are required, they may be assigned to the platoons 4 of the same group or assigned to the platoons 4 of different groups. In other words, the vehicles 5 dedicated for personnel transport may be assigned to platoons 4 in which the number of cooperations does not reach the maximum number, irrespective of groups.

The platoon organization processor 122 stores the information on the platoons 4 organized as described above, as the platoon organization information 173A, in the schedule DB 173. FIG. 24 shows an example of platoon organization information data 173A.

The platoon organization information 173A includes the identifier of the platoon 4 [platoon ID], departure station [departure S], the arrival station [arrival S], the departure time [departure time], a plurality of applicants, the necessity of cooperation with vehicles dedicated for personnel transport, and the necessity of arrangement of drivers, as shown in, for example, FIG. 24, and the applicant is constituted by a combination of the identifier of vehicle 3 [vehicle ID], the driver's identifier [driver ID], and the driver's status [status].

The applicants are arranged in the order of assignment of the vehicles 3 to the platoons 4, as described with reference to, for example, FIG. 22. Therefore, basically, the applicant for which the driver 3A rides in the vehicle 3 after admission to the platoon 4 is first recorded and then the applicant for which the driver 3A does not ride in the vehicle 3 after admission to the platoon 4 is recorded. As for the applicant for which the driver 3A does not ride, the platoon organization processor 122 stores, for example, a specific value indicative of not riding, as the driver's identifier. As for the driver's status, for example, information indicating whether the driver is driving the vehicle 3 leading the platoon 4 or not, the drive time, the drive start time, and the drive end time are recorded by the operation monitoring processor 125 to be described later. In addition, the status of this driver is the information which is to be the driver flag (2).

In addition, the necessity of cooperation with the vehicle dedicated for personnel transport is the information which becomes the platoon flag (1), and the necessity of arrangement of the driver is the information which becomes the platoon flag (2). The platoon flag (1) is set to ON when the vehicle 5 dedicated for personnel transport is made to cooperate, and the platoon flag (2) is set to ON when the arrangement of the driver 3B is required.

Next, the driver arrangement processor 123 and the personnel transport dedicated vehicle arrangement processor 124 performing a process of generating resource arrangement schedule information 173B and storing the information in the schedule DB 173, by using the platoon organization information 173A generated by the platoon organization processor 122 and stored in the schedule DB 173, will be described.

The resource arrangement schedule information 173B is the schedule information on arrangement of the drivers 3B and the vehicles 5 dedicated for personnel transport. The driver arrangement processor 123 generates the schedule information on arrangement of the drivers 3B. The personnel transport dedicated vehicle arrangement processor 124 generates the schedule information on arrangement of the vehicles 5 dedicated for personnel transport. The two types of schedule information include at least two elements of schedule information for a present day and a previous day. The schedule information of the previous day is used as initial information indicative of the arrangement status of the drivers 3B and the vehicles 5 dedicated for personnel transport at the operation end time of the previous day, to generate the schedule information of the present day. When the arrangement status of the drivers 3B and the vehicles 5 dedicated for personnel transport is always a predetermined status at the operation start time, the schedule information for the present day is unnecessary. For example, the information indicative of the predetermined status may be preliminarily stored in the basic information DB 172 and referred to when the resource arrangement schedule information 173B is generated.

The driver arrangement processor 123 first extracts the only platoon 4 that needs arrangement of the driver 3B, of all the platoons 4 organized by the platoon organization processor 122, by referring to the platoon flags (2) in the platoon organization information 173A stored in the schedule DB 173. When extracting the only platoon 4 that needs arrangement of the driver 3B, the driver arrangement processor 123 refers to the schedule information of the previous day on arrangement of the drivers 3B, of the resource arrangement schedule information 173B, and acquires the arrangement status of the drivers 3B at the operation end time of the previous day, i.e., the operation start time of the present day. When extracting the only platoon 4 that needs arrangement of the driver 3B and acquiring the arrangement status of the drivers 3B, the driver arrangement processor 123 generates an operation plan of the drivers 3B and stores the operation plan as the schedule information of the present day on the arrangement of the drivers 3B, in the schedule DB 173. As for the manner of generating the operation plan of the driver 3B, for example, a manner of a crew operation plan in the railroad scheduling, and the like can be applied.

The personnel transport dedicated vehicle arrangement processor 124 first extracts the only platoon 4 that is made to cooperate with the vehicle 5 dedicated for personnel transport, of all the platoons 4 organized by the platoon organization processor 122, by referring to the platoon flags (1) in the platoon organization information 173A stored in the schedule DB 173. When extracting the only platoon 4 that is made to cooperate with the vehicle 5 dedicated for personnel transport, the personnel transport dedicated vehicle arrangement processor 124 refers to the schedule information of the previous day on arrangement of the vehicles 5 dedicated for personnel transport, of the resource arrangement schedule information 173B, and acquires the arrangement status of the vehicles 5 dedicated for personnel transport at the operation end time of the previous day, i.e., the operation start time of the present day. When extracting the only platoon 4 that is made to cooperate with the vehicle 5 dedicated for personnel transport and acquiring the arrangement status of the vehicles 5 dedicated for personnel transport, the personnel transport dedicated vehicle arrangement processor 124 generates an operation plan of the vehicles 5 dedicated for personnel transport and stores the operation plan as the schedule information of the present day on the arrangement of the vehicles 5 dedicated for personnel transport, in the schedule DB 173. As for the manner of generating the operation plan of the vehicles 5 dedicated for personnel transport, for example, a manner of a car operation plan in the railroad scheduling, or the like can be employed.

Thus, this platooning operation system is capable of adaptive organization of the platoon 4 considering, for example, assignment of the driver 3A of the vehicle 3 leading the platoon 4, using driver information (driver flag) on the driver 3A, vehicle information (vehicle flag) on the vehicle 3, and platoon information (platoon flag) on the platoon 4.

In addition, the operation monitoring processor 125 acquires the information on which vehicle 3 (driver 3A)

leads the platoon 4 or its drive time, by the information transmitted from a portable device carried by the driver 3A of the vehicle 3 leading the platoon 4 at the departure time from the station 11 or the arrival time at the station 11, of the platoon 4. The operation monitoring processor 125 records the acquired information as the information on the applicants in the platoon organization information 173A stored in the schedule DB 173, more specifically, the driver's status [status]. This information is the information which is to be the driver flag (2) as described above.

As described above, the operation monitoring processor 125 also functions as a charge manager. The operation monitoring processor 125 refers to the platoon organization information 173A stored in the schedule DB 173, after ending the operation of each day, and calculates the charge amount to the admitted vehicle 3, in each platoon 4, based on the driving at the platooning and the drive time obtained from the platoon organization information 173A.

For example, the charge of the vehicle 3 in which the driver 3A has ridden, at the platooning, is calculated to be lower than the charge of the vehicle 3 in which the driver 3A has not ridden, at the platooning, in the same section. The charge of the vehicle 3 of the driver 3A who has performed driving for leading the platoon 4, of the vehicles 3 in which the drivers 3A have ridden at the platooning, is calculated to be lower than the charge of the vehicle 3 of the driver 3A who has not performed driving for leading the platoon 4. Furthermore, when a plurality of vehicles 3 of the drivers 3A who have performed driving for leading the platoon 4 exist, the charge of the vehicle 3 of the driver 3A having a longer drive time is calculated to be lower than the charge of the vehicle 3 of the driver 3A having a shorter drive time.

FIG. 25 is a flowchart showing a flow of an operation schedule generating process performed in the platooning operation system (service center 1-2).

The service center 1-2 first accumulates the number of vehicles 3 to be admitted to the platoon 4 for each section (of each direction) on the platoonable road 10, each departure time, and each performance (step C1). The service center 1 acquires the performance of each vehicle 3 by the vehicle flag.

In addition, the service center 1-2 accumulates the number of drivers 3A who ride in the vehicles from the departure station 11 to the arrival station 11 and who want to return to the departure station 11, for each section and each arrival time (step C2). More specifically, the service center 1-2 determines presence of the persons who want to return. Then, the service center 1-2 performs assignment of the vehicles 5 dedicated for personnel transport, based on the accumulation result (step C3). The assignment of the vehicles 5 dedicated for personnel transport is performed at the nearest departure time, in a section opposite to the section where the persons who want to return exist, after a certain period has elapsed from the arrival time at the arrival station 11.

Next, the service center 1-2 organizes the platoon 4 for each section, each departure time, and each performance (step C4). More specifically, the service center 1-2 first calculates the number of platoons 4. The number of platoons 4 is calculated by dividing the total number of vehicles by the number of cooperations. Next, the service center 1-2 equally assigns the vehicles 3 in which the drivers 3A ride to the calculated number of platoons 4, and, when the vehicle 5 dedicated for personnel transport is assigned, makes the vehicle 5 dedicated for personnel transport cooperate with any one of the platoons 4. The service center 1-2 acquires the vehicles 3 in which the drivers 3A ride by the driver flags (1), and sets the platoon flag (1) to ON on the platoon 4 cooperating with the vehicle 5 dedicated for personnel transport. Furthermore, the service center 1-2 determines whether arrangement of the driver 3B is necessary or not, for each platoon 4. This determination can be performed according to whether or not the number of vehicles 3 in which the drivers 3A ride exceeds the number obtained by dividing the scheduled run time of the section by the continuous drive time of one driver 3A. The service center 1-2 sets the platoon flag (2) to ON for the platoon 4 for which the driver 3B needs to be arranged.

Next, the service center 1-2 performs a process for arrangement of the driver 3B (step C5). More specifically, the service center 1-2 first extracts the only platoon 4 for which the driver 3B needs to be arranged, from all the platoons 4. The service center 1-2 performs the extraction of the corresponding platoon 4 by the platoon flag (2). When extracting the only platoon 4 for which the driver 3B needs to be arranged, the service center 1-2 generates the operation plan of the driver 3B.

In addition, the service center 1-2 performs a process for arrangement of the vehicle 5 dedicated for personnel transport (step C6). More specifically, the service center 1-2 first extracts the only platoon 4 for which the vehicle 5 dedicated for personnel transport needs to be arranged, from all the platoons 4. The service center 1-2 performs the extraction of the corresponding platoon 4 by the platoon flag (1). When extracting the only platoon 4 for which the vehicle 5 dedicated for personnel transport needs to be arranged, the service center 1-2 generates the operation plan of the vehicle 5 dedicated for personnel transport.

Incidentally, the process for arrangement of the driver 3B in step C5 and the process for arrangement of the vehicle 5 dedicated for personnel transport in step C6 may be performed while changing the order or may be executed in parallel.

Figure 26:
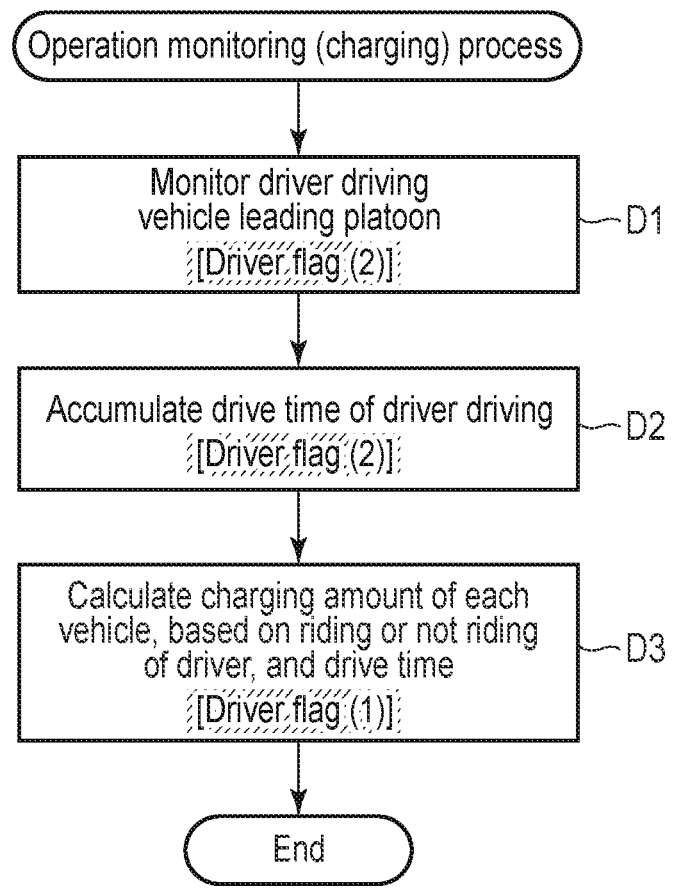
FIG. 26 is a flowchart showing a flow of an operation monitoring (charging) process performed in the platooning operation system (service center) according to the second embodiment.

In addition, FIG. 26 is a flowchart showing a flow of an operation monitoring (charging) process performed in the platooning operation system (service center 1-2).

The service center 1-2 detects the driver 3A who drives the vehicle 3 leading the platoon 4 (step D1). The service center 1 sets the driver flag (2) to ON for the detected driver 3A. In addition, the service center 1 accumulates the time when the driver flag (2) is set to ON, i.e., the drive time of the driver 3A, for each vehicle 3 (step D2).

Then, the service center 1 calculates the charge amount of each vehicle 3, based on riding of the driver 3A in the vehicle 3 admitted to the platoon 4 and the drive time of the driver 3A (step D3). Riding of the driver 3A can be determined by using the driver flag (1).

As described above, the platooning operation system of the present embodiment is capable of adaptive organization of the platoon 4 in consideration of, for example, assignment of the driver 3A of the vehicle 3 leading the platoon 4, by using the driver information on the driver 3A, the vehicle information on the vehicle 3, and the platoon information on the platoon 4.

The features included in the present embodiments will be described below.

[1]

A platooning operation system of organizing a platoon by making cooperation of vehicles traveling between two common bases on a road on which a plurality of vehicles are capable of cooperating to run as a platoon, the system comprising:

an application acceptance processor which accepts information for application to admit the vehicle to the platoon, the information being application information including a departure base and an arrival base, at least one of a departure time and an arrival time, an identifier of the vehicle, an identifier of a vehicle's driver, and riding at platooning;

a platoon organizing processor which organizes the platoon made to cooperate to run on the road, based on the application information accepted by the application acceptance processor; and a driver arranging processor which extracts a platoon for which a driver of a vehicle leading the platoon is to be arranged, from all platoons organized by the platoon organizing processor and generates a driver's operation plan, wherein the platoon organizing processor organizes the platoon and generating platoon information on the platoon including necessity of arrangement of the driver, based on driver information on the vehicle's driver including riding of the vehicle's driver at platooning, and vehicle information on the vehicle including performance of the vehicle, which is associated with the identifier of the vehicle and managed, and the driver arranging processor generates the driver's operation plan by using the platoon information including the necessity of arrangement of the driver.

[2]

The platooning operation system of [1], wherein:

the application information further includes presence of a person who wants to return to the departure base of the driver riding in the vehicle at the platooning;

the platoon organizing processor performs organization of the platoon including a vehicle dedicated for personnel transport to transport the driver who wants to return to the departure base, and generates the platoon information including cooperation with the vehicle dedicated for personnel transport; and the system further comprises a personnel transport dedicated vehicle arranging processor which extracts a platoon with the vehicle dedicated for personnel transport cooperates, from all platoons organized by the platoon organizing processor, and generates an operation plan of the vehicle dedicated for personnel transport, by using the platoon information including the cooperation with the vehicle dedicated for personnel transport.

[3]

The platooning operation system of [1] or [2], wherein the platoon organizing processor groups the vehicles traveling between the two common bases on the road, based on the performance indicated by the vehicle information, and organizes platoons for the respective groups.

[4]

The platooning operation system of any one of [1] to [3], wherein the platoon organizing processor organizes the platoons such that number of the vehicles in which the drivers ride at platooning is equal.

[5]

The platooning operation system of any one of claims [1] to [4], wherein when the number of drivers riding in the vehicles at the platooning is less than a number obtained by dividing a scheduled time of the platooning by a continuous drive time of one driver, the platoon organizing processor generates the platoon information on the platoon to indicate that arrangement of the driver is required.

[6]

The platooning operation system of [2], wherein when a driver who wants to return to a first base after moving from the first base to the second base by the platooning, the platoon organizing processor makes the vehicle dedicated for personnel transport cooperate with the platoon leaving the second base and traveling to the first base after a time when the platoon arrives at the second base and generates the platoon information on the platoon to indicate the cooperation of the vehicle dedicated for personnel transport.

[7]

The platooning operation system of any one of [1] to [6], further comprising a charge manager which manages charge of the vehicle admitted to the platoon, wherein:

the driver riding in the vehicle at the platooning is positioned as a person capable of driving the vehicle leading the platoon; and the charge manager calculates a charge amount to the vehicle in which the driver rides at the platooning to be lower than a charge amount to the vehicle in which the driver does not ride at the platooning.

[8]

The platooning operation system of [7], wherein:

the driver information further includes whether the driver is driving a vehicle leading the platoon when the platoon travels; and the charge manager calculates a charge amount to the vehicle of the driver, based on a time when the driver information indicates that the driver is driving the vehicle leading the platoon.

[9]

The platooning operation system of [8] wherein:

the driver information further includes an attribute of the driver managed in association with an identifier of the driver of the vehicle; and the platoon organizing processor selects a driver who drives in the vehicle leading the platoon from drivers riding the vehicles at the platooning, based on the attribute of the driver indicated by the driver information.

[10]

A platooning operation method for organizing a platoon by making cooperation of vehicles traveling between two common bases on a road on which a plurality of vehicles are capable of cooperating to run as a platoon, the method comprising:

accepting information for application to admit the vehicle to the platoon, the information being application information including a departure base and an arrival base, at least one of a departure time and an arrival time, an identifier of the vehicle, an identifier of a vehicle's driver, and riding at platooning;

organizing the platoon made to cooperate to run on the road, based on the application information accepted; and extracting a platoon for which a driver of a vehicle leading the platoon is to be arranged, from all platoons organized, and generating a driver's operation plan, wherein the organizing the platoon includes organizing the platoon and generating platoon information on the platoon including necessity of arrangement of the driver, based on driver information on the vehicle's driver including riding of the vehicle's driver at platooning, and vehicle information on the vehicle including performance of the vehicle, which is associated with the identifier of the vehicle and managed, and the generating the driver's operation plan includes generating the driver's operation plan by using the platoon information including the necessity of arrangement of the driver.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A platooning operation system of organizing a platoon by causing a plurality of vehicles each of which runs at least a first section from a first base to second base to cooperate in the first section, the system comprising:
    an application acceptance processor which is located at a service center which accepts an application of a vehicle for admission to the platoon, the application including an application item to specify whether or not a driver rides in the vehicle after the vehicle is admitted to the platoon, the driver being a person that drives the vehicle to the first base; and
    a platoon organization processor which is located at the service center and which selects a platoon to which the vehicle is to be admitted or determines possibility of admission of the vehicle to the platoon, based on whether or not the driver rides in the vehicle specified by the application item included in the application, and at least one of information on a driver driving the vehicle and information on the vehicle.

2. The platooning operation system of claim 1, wherein:
    the information on the driver includes information on a driver's license; and
    the platoon organization processor selects a platoon to which the vehicle is to be admitted or determines possibility of admission of the vehicle to the platoon, based on the information on the driver's license.

3. The platooning operation system of claim 1, wherein:
    the information on the driver includes information on physical condition; and
    the platoon organization processor selects a platoon to which the vehicle is to be admitted or determines possibility of admission of the vehicle to the platoon, based on the information on the physical condition.

4. The platooning operation system of claim 3, wherein the information on the vehicle includes output information of an alcometer.

5. The platooning operation system of claim 1, wherein:
    the information on the vehicle includes information on taking out an insurance; and
    the platoon organization processor selects a platoon to which the vehicle is to be admitted or determines the possibility of admission of the vehicle to the platoon, based on the information on taking out an insurance.

6. The platooning operation system of claim 5, wherein:
    the information on the vehicle includes information on a type of the insurance to be taken out; and
    the platoon organization processor selects a platoon to which the vehicle is to be admitted or determines the possibility of admission of the vehicle to the platoon, based on the information on the type of the insurance.

7. The platooning operation system of claim 1, wherein:
    the information on the vehicle includes information on performance; and
    the platoon organization processor selects a platoon to which the vehicle is to be admitted or determines the possibility of admission of the vehicle to the platoon, based on the information on the performance.

8. A platooning operation method of organizing a platoon by causing a plurality of vehicles each of which runs at least a first section from a first base to a second base to cooperate, the method comprising:
    accepting an application of a vehicle for admission to the platoon, the application including an application item to specify whether or not a driver rides in the vehicle after the vehicle is admitted to the platoon, the driver being a person that drives the vehicle to the first base; and
    selecting a platoon to which the vehicle is to be admitted or determining possibility of admission of the vehicle to the platoon, based on whether or not the driver rides in the vehicle specified by the application item included in the application, and at least one of information on a driver driving the vehicle and information on the vehicle.

* * * * *